US012449265B2

(12) United States Patent
Roggenkamp et al.

(10) Patent No.: US 12,449,265 B2
(45) Date of Patent: Oct. 21, 2025

(54) SYSTEM AND METHOD FOR DYNAMIC ROUTING

(71) Applicant: Polaris Industries Inc., Medina, MN (US)

(72) Inventors: Kyle T. Roggenkamp, Stacy, MN (US); Stacey E. Stewart, Stillwater, MN (US); Kevin E. Nelson, Osceola, WI (US); Joseph P. Nuxoll, San Jose, CA (US); Cindy L. Houeiss, Kasson, MN (US); Benjamin T. Edwards, Roseau, MN (US); Joseph D. Tharaldson, Taylor Falls, MN (US); Andrew C. Schmid, Brooklyn Park, MN (US); Elaine M. Scott, San Francisco, CA (US); Brenden Bungert, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/241,559

(22) Filed: Apr. 27, 2021

(65) Prior Publication Data

US 2021/0333114 A1    Oct. 28, 2021

Related U.S. Application Data

(60) Provisional application No. 63/016,684, filed on Apr. 28, 2020.

(51) Int. Cl.
*G01C 21/34* (2006.01)
*G01C 21/36* (2006.01)
*G01W 1/10* (2006.01)

(52) U.S. Cl.
CPC ..... *G01C 21/3415* (2013.01); *G01C 21/3682* (2013.01); *G01C 21/3694* (2013.01); *G01W 1/10* (2013.01)

(58) Field of Classification Search
CPC .................................................. G01C 21/3415
See application file for complete search history.

(56) References Cited

U.S. PATENT DOCUMENTS

| 9,869,563 | B2 | 1/2018 | Broadbent et al. |
| 9,964,412 | B2 | 5/2018 | Broadbent et al. |
| 10,203,219 | B2 | 2/2019 | Leblanc |

(Continued)

FOREIGN PATENT DOCUMENTS

| AU | 2018200169 A1 * | 2/2018 | ............. G01W 1/10 |
| AU | 2018200169 B2 * | 11/2019 | ............. G01W 1/10 |

(Continued)

OTHER PUBLICATIONS

J-PlatPat English translation of Katoka reference (Year: 2013).*

(Continued)

*Primary Examiner* — Shelley Chen
(74) *Attorney, Agent, or Firm* — Merchant & Gould, P.C.

(57) ABSTRACT

Systems and methods for dynamically planning a travel route using weather data for a recreational vehicle, dynamically navigating around inclement weather for a recreational vehicle, for dynamic fuel range mapping for a recreational vehicle, and/or for predicting a departure time to arrive at a destination on time for a recreational vehicle are disclosed.

23 Claims, 20 Drawing Sheets

(56) References Cited

U.S. PATENT DOCUMENTS

| | | | |
|---|---|---|---|
| 10,480,956 B2 * | 11/2019 | Leblanc | G01C 21/3676 |
| 2005/0187714 A1 * | 8/2005 | Brulle-Drews | G01W 1/10 |
| | | | 702/3 |
| 2009/0005962 A1 * | 1/2009 | Shinto | G08G 1/096838 |
| | | | 701/532 |
| 2010/0161222 A1 * | 6/2010 | Zhang | G08G 1/096716 |
| | | | 701/414 |
| 2011/0307168 A1 * | 12/2011 | Kieff | G01C 21/3492 |
| | | | 701/415 |
| 2013/0304379 A1 * | 11/2013 | Fulger | G08G 1/096775 |
| | | | 701/533 |
| 2014/0244110 A1 * | 8/2014 | Tharaldson | G06Q 50/01 |
| | | | 701/99 |
| 2014/0340241 A1 * | 11/2014 | Smart, Jr. | G08G 1/144 |
| | | | 340/932.2 |
| 2016/0003621 A1 * | 1/2016 | Koenig | B60K 35/90 |
| 2016/0068123 A1 * | 3/2016 | Helmhold | G01C 21/34 |
| | | | 701/2 |
| 2016/0069695 A1 | 3/2016 | Broadbent et al. | |
| 2017/0248433 A1 * | 8/2017 | Mahajan | G08G 1/096883 |
| 2018/0025638 A1 | 1/2018 | Fulger et al. | |
| 2018/0356242 A1 * | 12/2018 | Kritzmacher | B60W 50/0097 |
| 2019/0120652 A1 * | 4/2019 | Leblanc | G01C 21/3691 |
| 2019/0301877 A1 | 10/2019 | Duale et al. | |
| 2020/0118433 A1 | 4/2020 | Sakai | |
| 2021/0333114 A1 * | 10/2021 | Roggenkamp | G01C 21/3415 |

FOREIGN PATENT DOCUMENTS

| | | | | | |
|---|---|---|---|---|---|
| CA | 2950752 C | * | 8/2022 | | B60R 16/0236 |
| CN | 103029625 A | * | 4/2013 | | G08G 1/0967 |
| DE | 102013205148 B4 | * | 5/2019 | | G01W 1/00 |
| JP | 3696532 B2 | * | 9/2005 | | B60J 7/0573 |
| JP | 4062804 B2 | * | 3/2008 | | |
| JP | 2010-025697 | | 2/2010 | | |
| JP | 2011-022106 | | 2/2011 | | |
| JP | 2013181956 A | * | 9/2013 | | G01C 21/3673 |
| JP | 2013200258 A | * | 10/2013 | | G01C 21/3691 |
| JP | 2016517010 A | | 6/2016 | | |
| JP | 2019-3184 A | | 1/2019 | | |
| WO | WO-2017172484 A1 | * | 10/2017 | | G01C 21/3453 |
| WO | WO-2019079004 A1 | * | 4/2019 | | B64C 39/02 |
| WO | WO-2020070051 A1 | * | 4/2020 | | B60C 23/0493 |

OTHER PUBLICATIONS

International Search Report and Written Opinion received for PCT Patent Application No. PCT/US21/29342, mailed on Sep. 8, 2021, 10 pages.

Invitation to Pay Additional Fees received for PCT Patent Application No. PCT/US21/29342, mailed on Jun. 17, 2021, 2 pages.

European Search Report issued by the European Patent Office, dated Mar. 20, 2024, for European Patent Application No. 21797850.1; 9 pages.

* cited by examiner

SYSTEM AND METHOD FOR DYNAMIC ROUTING

RELATED APPLICATION

This application claims the benefit of U.S. Provisional Application No. 63/016,684, filed Apr. 28, 2020, titled SYSTEM AND METHOD FOR DYNAMIC ROUTING, the entire disclosure of which is expressly incorporated by reference herein.

TECHNICAL FIELD

The present disclosure relates generally to route planning devices and methods of operating the same. The present disclosure relates more specifically to improvement in computing operation in route planning devices that increases speed and efficiency thereof.

BACKGROUND

Recreational vehicles, such as motorcycles, or off-road vehicles such as all-terrain vehicles (ATVs) and snowmobiles, are widely used for recreational purposes. These vehicles might be used on both roads and trails, or only on trails. The trails often pass over a mixture of private and public properties, which can extend for hundreds of miles in many directions, and through different areas. Such trails generally extend through rural areas.

SUMMARY

As set forth above, embodiments provided herein relate to route planning for a recreational vehicle. Exemplary embodiments include but are not limited to the following examples.

In one aspect, a navigation system for dynamically planning a travel route using weather data for a recreational vehicle include a display screen, a processor, and memory. The memory includes instructions that when executed by the processor cause the processor to receive a destination from a user, determine a travel route to the destination, obtain weather data of locations along the travel route, display the travel route with a weather indicator along the travel route based on the weather data and an estimated arrival time, wherein the weather indicator indicates forecasted weather when the recreational vehicle reaches respective location along the travel route, display an alternative route to the destination with the weather indicator along the alternative route and a new estimated arrival time, receive a request to set the alternative route to a new travel route, and navigate to the destination via the new travel route.

In some embodiments, the memory may further include instructions that when executed by the processor cause the processor to determine an estimated arrival time to the destination via the travel route based on the weather data and determine a new estimated arrival time to the destination via the alternative route based on the weather data. To display the travel route with the weather indicator along the travel route may include to display the travel route with the weather indicator with the estimated arrival time. Additionally, to display alternative route to the destination with the weather indicator may include to display alternative route to the destination with the weather indicator with the new estimated arrival time.

In some embodiments, the weather may include a color coding to indicate a percentage chance of precipitation at the time the recreational vehicle reaches each location along the travel route.

In some embodiments, the memory may further include instructions that when executed by the processor cause the processor to query the user whether to display an alternative route based on the weather indicator.

In some embodiments, the memory may further include instructions that when executed by the processor cause the processor to continuously or periodically obtain updated weather data, determine any changes in the forecasted weather along the travel route, and display, in response to determination of any changes in the forecasted weather, the travel route with an updated weather indicator and an updated estimated arrival time.

In another aspect, a method for dynamically planning a travel route using weather data for a recreational vehicle includes receiving, by a navigation system of the recreational vehicle, a destination from a user, determining, by the navigation system, a travel route to the destination, obtaining, by the navigation system, weather data of locations along the travel route, displaying, by the navigation system, the travel route with a weather indicator along the travel route based on the weather data, wherein the weather indicator indicates forecasted weather when the recreational vehicle reaches respective location along the travel route, displaying, by the navigation system, an alternative route to the destination with the weather indicator along the alternative route, receiving, by the navigation system, a request to set the alternative route to a new travel route, and navigating, by the navigation system, to the destination via the new travel route.

In some embodiments, the method may further include determining, by the navigation system, an estimated arrival time to the destination via the travel route based on the weather data and determining, by the navigation system, a new estimated arrival time to the destination via the alternative route based on the weather data. In some embodiments, displaying the travel route with the weather indicator along the travel route may include displaying the travel route with the weather indicator with the estimated arrival time. Additionally, displaying alternative route to the destination with the weather indicator may include displaying alternative route to the destination with the weather indicator with the new estimated arrival time.

In some embodiments, the weather indicator may include a color coding to indicate a percentage chance of precipitation at the time the recreational vehicle reaches each location along the travel route.

In some embodiments, the method may further include querying, by the navigation system, the user whether to display an alternative route based on the weather indicator.

In some embodiments, the method may further include continuously or periodically obtaining, by the navigation system, updated weather data, determining, by the navigation system, any changes in the forecasted weather along the travel route, and displaying, in response to determining any changes in the forecasted weather and by the navigation system, the travel route with an updated weather indicator and an updated estimated arrival time.

In another aspect, a navigation system for dynamically navigating around inclement weather for a recreational vehicle includes a display screen, a processor, memory. The memory includes instructions that when executed by the processor cause the processor to receive a destination from a user, determine a travel route to the destination, obtain weather data of locations along the travel route, determine whether inclement weather is expected along the travel route based on the weather data, and determine, in response to determination that the inclement weather is expected, if an alterative route to the destination is available to avoid the inclement weather.

In some embodiments, the memory may further include instructions that when executed by the processor cause the processor to display, in response to determination that the alternative route is available, the alternative route to the user, receive a request to set the alternative route to a new travel route, and navigate to the destination via the new travel route.

In some embodiments, the memory may further include instructions that when executed by the processor cause the processor to notify, in response to determining that the alternative route is unavailable, the user how much time the user has until expecting to experience the inclement weather, query the user whether to seek lodging before experiencing inclement weather, determine, in response to a receipt of a response to seek lodging, one or more lodging locations, display the one or more lodging locations, receive a response from the user indicating a lodging location selected from the one or more lodging locations, and determine a new route to the selected lodging location.

In some embodiments, the memory may further include instructions that when executed by the processor cause the processor to query the user whether to notify someone that an expected arrival time has changed, receive a response from the user requesting to notify one or more contacts, and transmit, in response to a receipt of the response, a message to the one or more contacts.

In another aspect, a method for dynamically navigating around inclement weather for a recreational vehicle includes receiving, by a navigation system of the recreational vehicle, a destination from a user, determining, by the navigation system, a travel route to the destination, obtaining, by the navigation system, weather data of locations along the travel route, determining, by the navigation system, whether inclement weather is expected along the travel route based on the weather data, and determining, in response to determining that the inclement weather is expected and by the navigation system, if an alterative route to the destination is available to avoid the inclement weather.

In some embodiments, the method may further include displaying, in response to determining that the alternative route is available and by the navigation system, the alternative route to the user, receiving, by the navigation system, a request to set the alternative route to a new travel route, and navigating, by the navigation system, to the destination via the new travel route.

In some embodiments, the method may further include notifying, in response to determining that the alternative route is unavailable and by the navigation system, the user how much time the user has until expecting to experience the inclement weather, querying, by the navigation system, the user whether to seek lodging before experiencing inclement weather, determining, in response to receiving a response to seek lodging and by the navigation system, one or more lodging locations, displaying, by the navigation system, the one or more lodging locations, receiving, by the navigation system, a response from the user indicating a lodging location selected from the one or more lodging locations, and determining, by the navigation system, a new route to the selected lodging location.

In some embodiments, the method may further include querying, by the navigation system, the user whether to notify someone that an expected arrival time has changed, receiving, by the navigation system, a response from the user requesting to notify one or more contacts, and transmitting, in response to receiving the response and by the navigation system, a message to the one or more contacts.

In another aspect, a navigation system for dynamic fuel range mapping for a recreational vehicle includes a display screen, a processor, and memory. The memory includes instructions that when executed by the processor cause the processor to receive a destination from a user, determine a travel route to the destination, determine one or more current vehicle parameters, dynamically update a fuel range based on the one or more current vehicle parameters, and generate a visual map on a display screen with a fuel range indicator indicating a different level of fuel range.

In some embodiments, the fuel range may indicate approximately how far the recreational vehicle can travel with the current fuel level.

In some embodiments, the one or more current vehicle parameters may include fuel level percentage and average fuel economy.

In some embodiments, the memory may further include instructions that when executed by the processor cause the processor to determine one or more current ride conditions, wherein to dynamically update the fuel range may include to dynamically update the fuel range based on the one or more current vehicle parameters and the one or more current ride conditions.

In some embodiments, the one or more current ride conditions may include weather and road condition.

In some embodiments, the memory may further include instructions that when executed by the processor cause the processor to determine whether the recreational vehicle can travel to the destination via the travel route without a fuel stop, determine a gas station near the travel route where the recreational vehicle is likely to run out of fuel, display the gas station on the visual map on the display screen, and determine a new travel route that includes a new stop to the gas station.

In some embodiments, the gas station may be located at the nearest to the travel route before the fuel runs out.

In some embodiments, the memory may further include instructions that when executed by the processor cause the processor to query the user whether to add a new stop to the gas station before reaching the destination.

In some embodiments, the memory may further include instructions that when executed by the processor cause the processor to update the fuel range based on the added stop to the destination, updated one or more vehicle parameters, and/or updated one or more ride conditions.

In another aspect, a method for dynamic fuel range mapping for a recreational vehicle includes receiving, by a navigation system of the recreational vehicle, a destination from a user, determining, by the navigation system, a travel route to the destination, determining, by the navigation system, one or more current vehicle parameters, dynamically updating, by the navigation system, a fuel range based on the one or more current vehicle parameters, and generating, by the navigation system, a visual map on a display screen with a fuel range indicator indicating a different level of fuel range.

In some embodiments, the fuel range may indicate approximately how far the recreational vehicle can travel with the current fuel level.

In some embodiments, the one or more current vehicle parameters may include fuel level percentage and average fuel economy.

In some embodiments, the method may further include determining one or more current ride conditions, wherein dynamically updating the fuel range may include dynamically updating the fuel range based on the one or more current vehicle parameters and the one or more current ride conditions.

In some embodiments, the one or more current ride conditions may include weather and road condition.

In some embodiments, the method may further include determining, by the navigation system, whether the recreational vehicle can travel to the destination via the travel route without a fuel stop, determining, by the navigation system, a gas station near the travel route where the recreational vehicle is likely to run out of fuel, displaying, by the navigation system, the gas station on the visual map on the display screen, and determining, by the navigation system, a new travel route that includes a new stop to the gas station.

In some embodiments, the gas station may be located at the nearest to the travel route before the fuel runs out.

In some embodiments, the method may further include querying, by the navigation system, the user whether to add a new stop to the gas station before reaching the destination.

In some embodiments, the method may further include updating, by the navigation system, the fuel range indicator based on the added stop to the destination, updated one or more vehicle parameters, and/or updated one or more ride conditions.

In another aspect, a navigation system for predicting a departure time to arrive at a destination on time for a recreational vehicle includes a display screen, a processor, and memory. The memory includes instructions that when executed by the processor cause the processor to receive desired arrival time at a destination via a selected travel route, activate delayed-start navigation, determine current location and travel time to the destination via the selected travel route based on at least the current location, determine departure time based on the travel time, determine whether the departure time is within a predefined time period from present time, and notify the user that the departure time is approaching.

In some embodiments, the travel time may indicate approximate time that the recreational vehicle needs to travel from the current location to the destination via the selected travel route at present time.

In some embodiments, the departure time may indicate when the user needs to leave to the destination in order to arrive at the desired arrival time.

In some embodiments, to determine the travel time to the destination includes to determine the travel time to the destination based on the current location and traffic along the selected travel route at present time.

In some embodiments, the memory may further include instructions that when executed by the processor cause the processor to receive the destination from a user, determine one or more travel routes to the destination, and receive the selected travel route from the one or more travel routes selected by the user.

In some embodiments, the memory may further include instructions that when executed by the processor cause the processor to determine whether the user requested to start navigation immediately or cancelled the delayed-start navigation, start, in response to determination that the user requested to start the navigation immediately, the navigation to the destination via the selected travel route, and deactivate, in response to determination that the user requested to cancel the delayed-start navigation, the delayed-start navigation.

In some embodiments, the memory may further include instructions that when executed by the processor cause the processor to receive, in response to a notification to the user that the departure time is approaching, a request from the user to start navigation and start navigation to the destination via the selected travel route.

In another aspect, a method for predicting a departure time to arrive at a destination on time for a recreational vehicle includes receiving, by the navigation system of the recreational vehicle, desired arrival time at a destination via a selected travel route, activating, by the navigation system, delayed-start navigation, determining, by the navigation system, current location and travel time to the destination via the selected travel route based on at least the current location, determining, by the navigation system, departure time based on the travel time, determining, by the navigation system, whether the departure time is within a predefined time period from present time, and notifying, by the navigation system, the user that the departure time is approaching.

In some embodiments, the travel time may indicate approximate time that the recreational vehicle needs to travel from the current location to the destination via the selected travel route at present time.

In some embodiments, the departure time may indicate when the user needs to leave to the destination in order to arrive at the desired arrival time.

In some embodiments, determining the travel time to the destination may include determining the travel time to the destination based on the current location and traffic along the selected travel route at present time.

In some embodiments, the method may further include receiving, by a navigation system of the recreational vehicle, the destination from a user, determining, by the navigation system, one or more travel routes to the destination, and receiving, by the navigation system, the selected travel route from the one or more travel routes selected by the user.

In some embodiments, the method may further include determining, by the navigation system, whether the user requested to start navigation immediately or cancelled the delayed-start navigation, starting, in response to determining that the user requested to start the navigation immediately and by the navigation system, the navigation to the destination via the selected travel route, and deactivating, in response to determining that the user requested to cancel the delayed-start navigation and by the navigation system, the delayed-start navigation.

In some embodiments, the method may further include receiving, in response to notifying the user that the departure time is approaching and by the navigation system, a request from the user to start navigation and starting, by the navigation system, navigation to the destination via the selected travel route.

In another aspect, a navigation system for navigating to a place of interest includes a display screen, a processor, and memory. The memory includes instructions that when executed by the processor cause the processor to determine a first list of places of interest, display the first list to a user of the recreational vehicle on the display screen, receive a place of interest selected by the user from the first list, determine a second list associated with the place of interest, the second list including one or more nearby locations of the place of interest, and display the second list on the display screen.

In some embodiments, to determine the first list of places of interest may include to determine one or more places that the user of the recreational vehicle is likely to search for and/or has previously searched for.

In some embodiments, the first list of places of interest may include at least one of airport, bank, highway, medical service, and parking.

In some embodiments, to determine the second list may include to determine a distance and a direction to each of the one or more nearby locations of the place of interest relative to a current location of the recreational vehicle, and to display the second list may include to display the distance and the direction to each of the one or more nearby locations of the place of interest relative to the current location of the recreational vehicle.

In some embodiments, the memory may further include instructions that when executed by the processor cause the processor to determine a traffic condition of the one or more nearby locations of the place of interest, wherein to display the second list may include to display the one or more nearby locations of the place of interest with corresponding traffic condition.

In some embodiments, the traffic condition may be color coded.

In another aspect, a method for navigating to a place of interest includes determining, by the navigation system, a first list of places of interest, displaying, by the navigation system, the first list to a user of the recreational vehicle, receiving, by the navigation system, a place of interest selected by the user from the first list, determining, by the navigation system, a second list associated with the place of interest, the second list including one or more nearby locations of the place of interest, and displaying, by the navigation system, the second list.

In some embodiments, determining the first list of places of interest may include determining one or more places that the user of the recreational vehicle is likely to search for and/or has previously searched for.

In some embodiments, the first list of places of interest may include at least one of airport, bank, highway, medical service, and parking.

In some embodiments, determining the second list may include determining a distance and a direction to each of the one or more nearby locations of the place of interest relative to a current location of the recreational vehicle, and wherein displaying the second list may include displaying the distance and the direction to each of the one or more nearby locations of the place of interest relative to the current location of the recreational vehicle.

In some embodiments, the method may further include determining, by the navigation system, a traffic condition of the one or more nearby locations of the place of interest, wherein displaying the second list may include displaying the one or more nearby locations of the place of interest with corresponding traffic condition.

In some embodiments, the traffic condition may be color coded.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Figure 1:
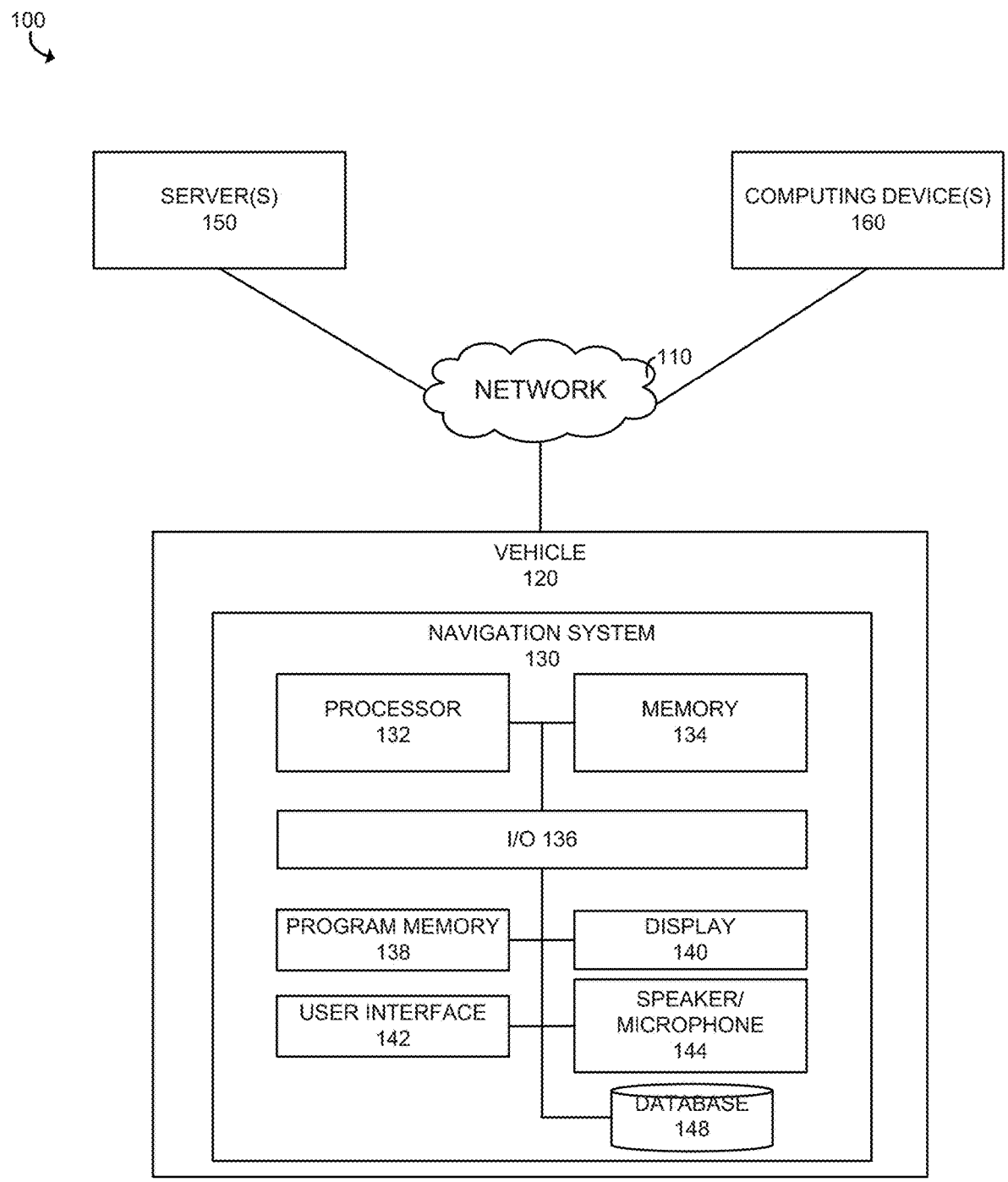
FIG. 1 illustrates a system for dynamic routing including a vehicle having a navigation system, according to an example of the present disclosure.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION OF THE DRAWINGS

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

FIG. 1 is a block diagram of a computer system 100 for dynamic routing. In the illustrative embodiment, the system 100 includes a vehicle 120 of a user, one or more servers 150, and one or more computing devices 160 associated with the user. The one or more servers 150 and the one or more computing devices 160 are communicatively coupled to the vehicle 120 via a network 110. The server 150 generally corresponds to one or more computing systems configured to communicate with the vehicle 120 to provide and/or receive data (e.g., GPS data, weather data, and map data). For example, the server 150 may be a service provider computer system associated with the vehicle (e.g., a GPS data provider computer system, weather data provider computer system, or map data provider computer system).

In the illustrative embodiment, the vehicle 120 includes a navigation system 130, which further includes a processor 132, a memory 134, an input/output (I/O) controller 136 (e.g., a network transceiver), a memory unit 138, a display screen 140, a user interface 142, and a speaker/microphone 144, all of which may be interconnected via one or more address/data bus. Although the I/O controller 136 is shown as a single block, it should be appreciated that the I/O controller 136 may include a number of different types of I/O components. It should be appreciated that the display screen 140 may be a touch screen. The user interface 142 may include one or more input devices that can receive user input (e.g., a touch pad, a keyboard, buttons). It should be appreciated that the navigation system 130 is communicatively coupled to the vehicle 120. Such communication may be via wire or wireless connection. Although the navigation system 130 is shown in FIG. 1 as being part of the vehicle 120, in some embodiments, the navigation system 130 may be implemented on a computing device that is separate from the vehicle 120. For example, the navigation system 130 may be embodied as an application executed on a mobile device that is communicatively coupled to the vehicle 120.

The processor 132 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the navigation system 130) may be performed by one or more processors 132. The memory 134 may be a random-access memory (RAM), read-only memory (ROM), a flash memory, or any other suitable type of memory that enables storage of data such as instruction codes that the processor 132 needs to access in order to implement any method as disclosed herein. It should be appreciated that although only one processor 132 is shown, the navigation system 130 may include multiple processors 132.

The navigation system 130 may further include a database 148. As used herein, the term "database" may refer to a single database or other structured data storage, or to a collection of two or more different databases or structured data storage components. In the illustrative embodiment, the database 148 is part of the navigation system 130. In some embodiments, the navigation system 130 may access the database 148 via a network such as network 110. The database 148 may store data that is received from and/or to be transmitted to the server(s) 150 and/or the computing device(s) 160.

The navigation system 130 may further include a number of software applications stored in memory unit 138, which may be called a program memory. The various software applications on the navigation system 130 may include specific programs, routines, or scripts for performing processing functions associated with the methods described herein. Additionally or alternatively, the various software applications on the navigation system 130 may include general-purpose software applications for data processing, database management, data analysis, network communication, web server operation, or other functions described herein or typically performed by a navigation system of a vehicle. The various software applications may be executed on the same computer processor or on different computer processors. Additionally, or alternatively, the software applications may interact with various hardware modules that may be installed within or connected to the navigation system 130. Such modules may implement part of or all of the various exemplary method functions discussed herein or other related embodiments. Although only one navigation system 130 is shown in FIG. 1, the server(s) 150 is capable of communicating with multiple navigation systems similar to the navigation system 130.

In general, the computing device 160 may include any existing or future devices capable of collecting, receiving, storing, transmitting, and/or displaying data to and from the user. For example, the computing device may be, but not limited to, a computer, a notebook, a laptop, a mobile device, a smartphone, a tablet, wearable, smart glasses, or any other suitable computing device that is capable of communicating with the server 150 and/or the navigation system 130.

The network 110 is any suitable type of computer network that functionally couples the navigation system 130 of the vehicle 120 with at least one computing device 160 and/or at least one server 150. The network 110 may include a proprietary network, a secure public internet, a virtual private network and/or one or more other types of networks, such as dedicated access lines, plain ordinary telephone lines, satellite links, cellular data networks, or combinations thereof. In embodiments where the network 110 comprises the Internet, data communications may take place over the network 110 via an Internet communication protocol.

The network 110 may be, or include, any number of different types of communication networks such as, for example, a bus network, a short messaging service (SMS), a local area network (LAN), a wireless LAN (WLAN), a wide area network (WAN), a personal area network (PAN), the Internet, a P2P network, custom-designed communication or messaging protocols, and/or the like. The network 110 may include a combination of multiple networks.

It should be appreciated that this diagram is merely an example, which should not unduly limit the scope of the claims. One of ordinary skill in the art would recognize many variations, alternatives, and modifications.

Figure 2:
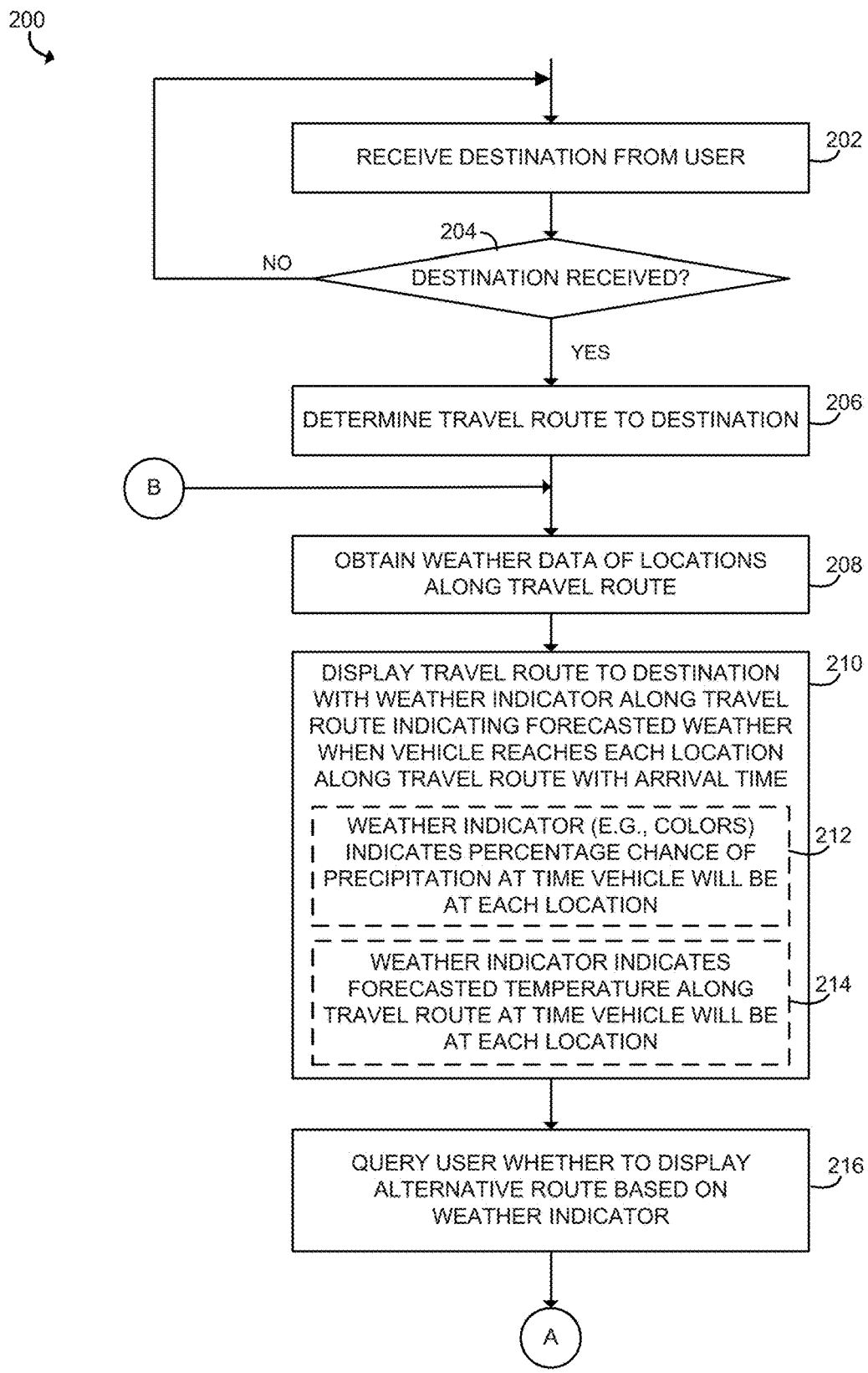
FIGS. 2 and 3 are a flow diagram illustrating a computer-implemented method for dynamically planning a travel route using weather data.
Figure 3:
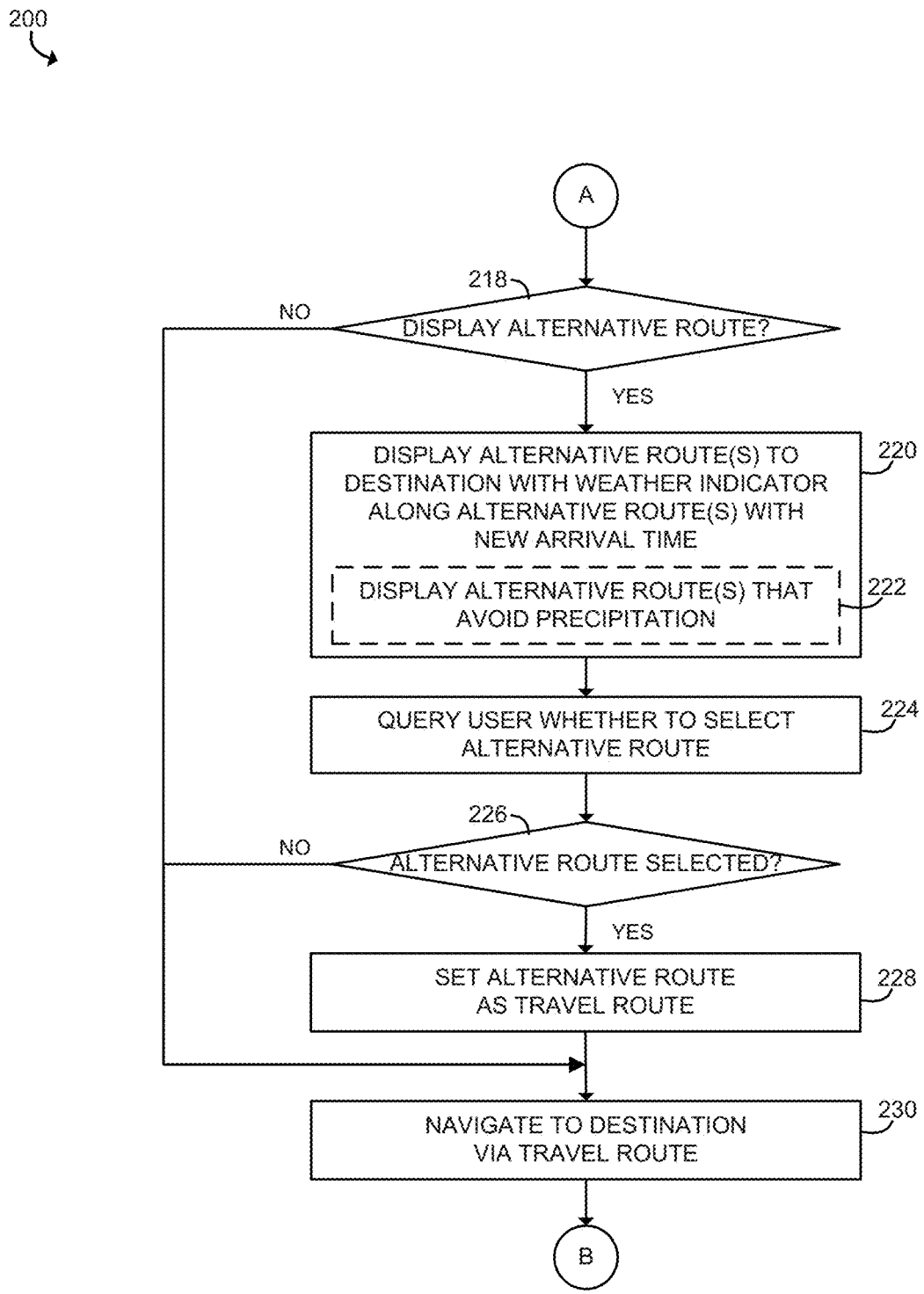

Referring now to FIGS. 2 and 3, a computer-implemented method 200 for dynamically planning a travel route using weather data is shown. In the illustrative embodiment, the method 200 is performed by a navigation system (e.g., 130) of a vehicle (e.g., 120). To do so, in block 202, the navigation system 130 receives a destination from a user (e.g., a driver/rider or passenger of the vehicle). In the illustrative embodiment, the destination may be received via a display screen (e.g., 140) and/or a user interface (e.g., 142) of the navigation system 130. However, it should be appreciated that, in some embodiments, the destination may be received via the computing device (e.g., 160) that is communicatively coupled to the navigation system 130. As discussed above, the computing device may be a mobile device, a smartphone, a tablet, a computer, a notebook, a laptop, or any other suitable computing device that is communicatively coupled to the navigation system to provide data (e.g., user input, weather data, GPS data, and/or map data).

If the navigation system 130 determines that a destination has not been received in block 204, the method 200 loops back to block 202 to continue waiting for a destination to be received from the user. If, however, the navigation system 130 determines that a destination has been received in block 204, the method 200 advances to block 206.

In block 206, the navigation system 130 determines a travel route to the destination. Subsequently, in block 208, the navigation system 130 obtains weather data of locations along the travel route from a server (e.g., 150) and/or a computing device (e.g., 160).

Subsequently, in block 210, the navigation system 130 displays on a display screen (e.g., 140) a map with the travel route to the destination with a weather indicator along the travel route with an estimated arrival time. The weather indicator indicates forecasted weather when the vehicle reaches each location along the travel route. In some embodiments, the travel route may be color coded to indicate a percentage chance of precipitation (e.g., rain, snow, sleet, or hail) at the time the vehicle will be at each location, as indicated in block 212.

Figure 4:
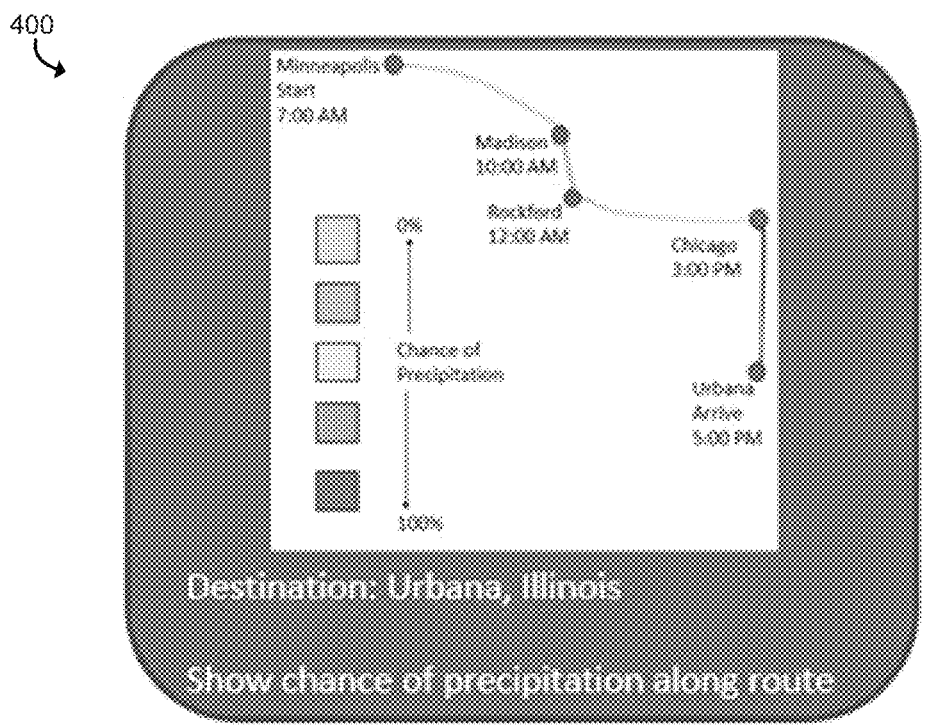
FIG. 4 is example screenshots of a display screen of the navigation system of the vehicle illustrating a map with weather indicators along a travel route.
Figure 4:
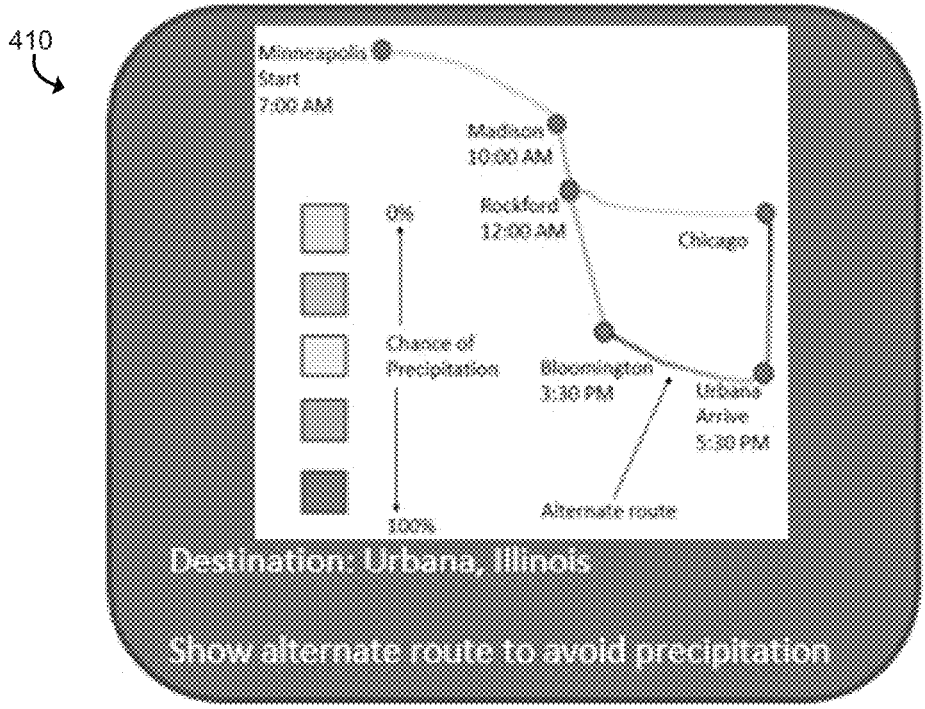
Figure 5:
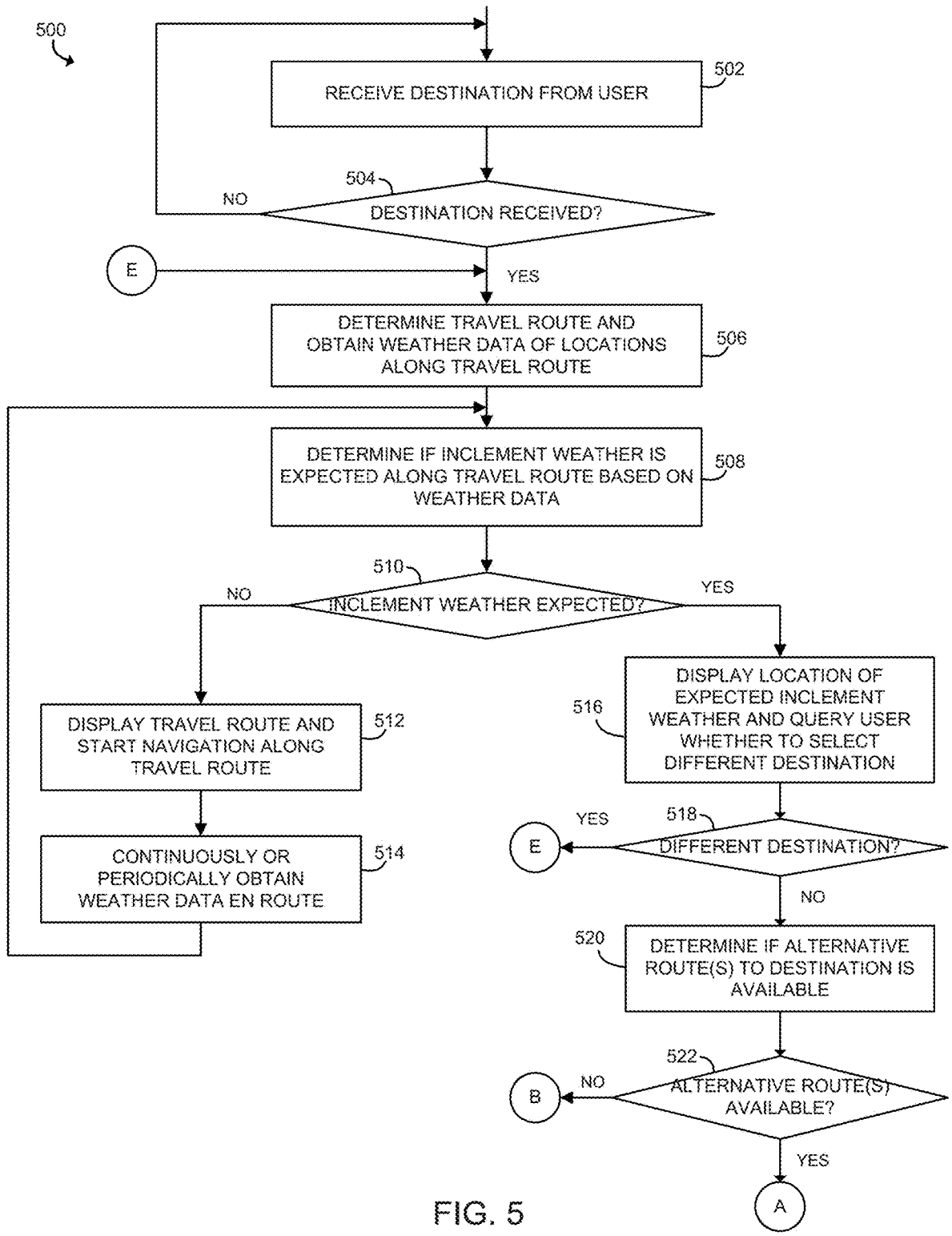
FIGS. 5-8 are a flow diagram illustrating a computer-implemented method for dynamically navigating around inclement weather.
Figure 6:
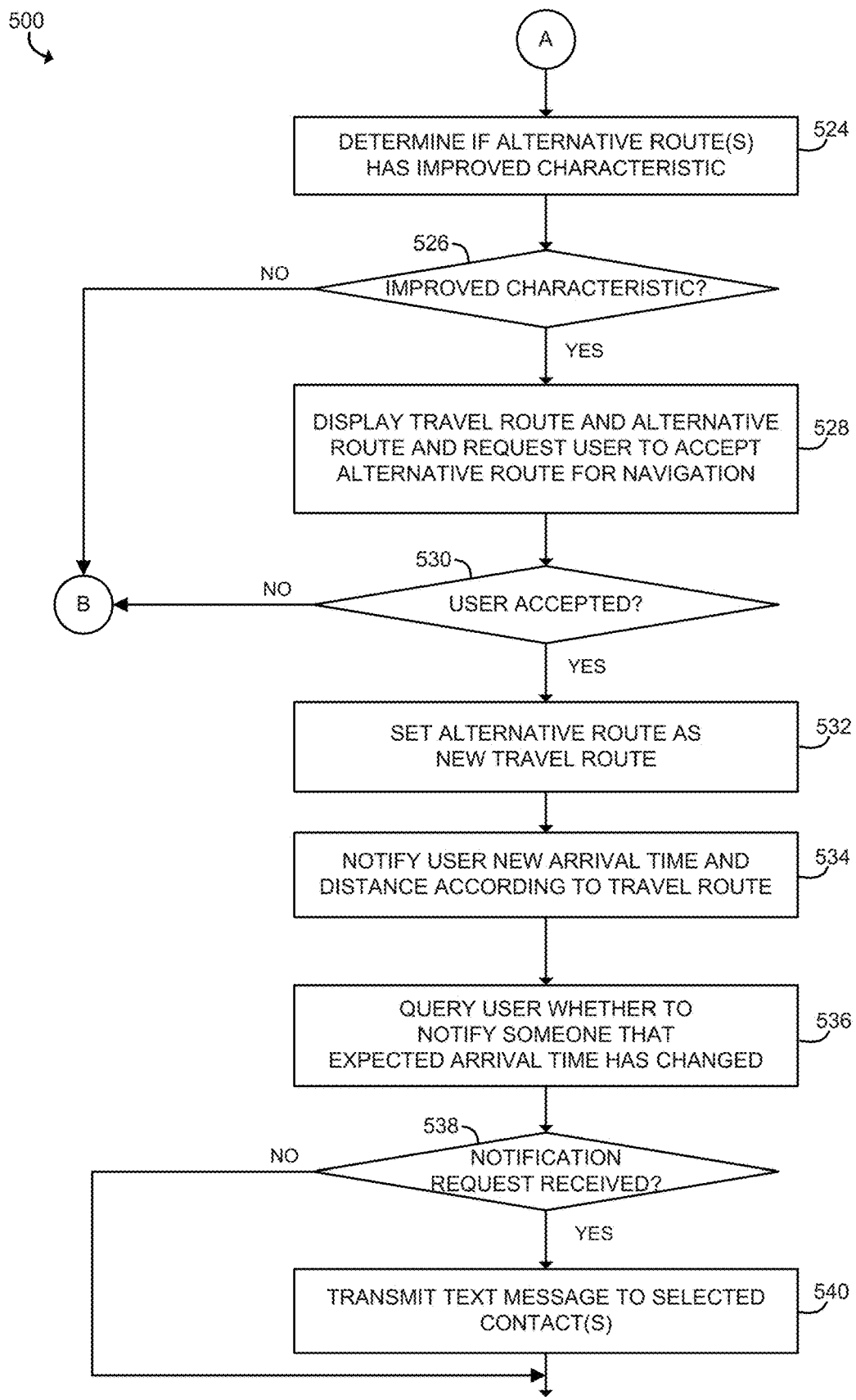

For example, FIG. 4 illustrates example screenshots 400, 410 of a display screen of the navigation system 130. As shown in the screenshots 400, 410, a user may be travelling from Minneapolis, Minnesota to Urbana, Illinois. In response to receiving from the user that the destination is Urbana, Illinois, the navigation system 130 determines that the travel route is Minneapolis-Madison-Rockford-Chicago-Urbana with an estimated arrival time at the destination and at each of the intermediary cities, as shown in the screenshot 400. The travel route is color coded to indicate a chance of precipitation at the time the vehicle will be at each location along the travel route. A number of locations along the travel route (e.g., intermediary cities, towns, or intersections) displayed on the navigation system may depend on the length of the travel route, the speed of the travel, and/or other factors to display the information that is appropriate to the travel condition. For example, a shorter route may require more points to enable accurate display of the inclement weather risk. In other example, the navigation system 130 may allow a user to change a number of points along the travel route (e.g., may select specific cities, towns, intersections, may select or modify a specific time period along the travel route). In embodiments, weather conditions may be determined for points along a route and the weather conditions for route segments are interpolated between these discrete points and the color coding of the route sections are color coded to illustrate these discrete and interpolated values.

Specifically, the illustrative screenshot 400 indicates that the chance of rain increases as the vehicle passes through Rockford, and it is likely to rain when the vehicle is travelling from Chicago and Urbana.

Additionally or alternatively, in some embodiments, the user may select to show forecasted temperature along the travel route. In such embodiments, the weather indicator on the map may indicate forecasted temperature along the travel route at the time the vehicle will be at each location, as indicated in block 214.

In the illustrative embodiment, the navigation system 130 queries the user whether to display one or more alternative routes based on the weather indicator, as indicated in block 216. For example, if the weather indicator indicates a high chance of rain along the travel route, the user may select to display an alternative route that avoids precipitation. If the navigation system 130 receives a user input that indicates that the user does not want to display an alternative route in block 218, the method 200 skips ahead to block 230 to navigate to the destination via the original travel route. If, however, the navigation system 130 receives a user input that indicates that the user wants to display an alternative route in block 218, the method 200 advances to block 220 to display one or more alternative routes to the destination. It should be appreciated that, in some embodiments, blocks 216 and 218 may be optional features. In such embodiments, based on the forecasted weather along the travel route, the navigation system 130 may determine to display one or more alternative routes to the destination with the original travel route. For example, if the navigation system 130 determines that there is a high chance of precipitation (e.g., greater than 50% of precipitation) along the travel route, the navigation system 130 may display one or more alternative routes to the destination that avoid precipitation without querying the user whether to display alternative routes.

In block 220, the navigation system 130 displays one or more alternative routes to the destination with the weather indicator along the respective alternative route and new estimated arrival times for each alternative route. For example, in the example where the weather indicator indicates a percent chance of precipitation along a travel route, the navigation system 130 may further display one or more alternative routes to avoid the precipitation, as indicated in block 222.

Referring back to the example illustrated in FIG. 4, the original travel route was Minneapolis-Madison-Rockford-Chicago-Urbana with the estimated arrival time at the destination and at each of the intermediary cities, as shown in the screenshot 400. As shown in the screenshot 410, an alternative route, which is Minneapolis-Madison-Rockford-Bloomington-Urbana in this example, may be displayed to avoid precipitation with a new estimated arrival time at the destination and at each of the intermediary cities. The alternative route is also color coded to indicate a chance of precipitation at the time the vehicle will be at each location along the alternative route. Specifically, the screenshot 410 indicates that the alternative route minimizes a chance of encountering rain by travelling through Bloomington instead of Chicago.

After the one or more alternative routes are displayed to the user, the navigation system 130 queries the user whether to select one of the alternative routes, as indicated in block 224. In the illustrative embodiment, the user selection may be received via the display screen 140 or the user interface 142 of the navigation system 130. However, it should be appreciated that, in some embodiments, the destination may be received via the computing device 160. If the navigation system 130 determines that the user indicated not to select an alternative route (e.g., explicitly or implicitly by not selecting an alternative route) in block 226, the method 200 skips ahead to block 230 to start navigation to the destination via the original travel route. If, however, the navigation system 130 determines that the user has selected an alternative route in block 226, the method 200 proceeds to block 228 to set the selected alternative route as a new travel route. Subsequently, in block 230, the navigation system 130 navigate to the destination via the new travel route.

In the illustrative embodiment, the navigation system 130 continuously or periodically obtains new weather data to determine any changes in the forecasted weather along the travel route and suggest one or more alternative route(s) to avoid the forecasted weather (e.g., precipitation). To do so, while navigating to the destination via the travel route, the method 200 loops back to block 208 to continue obtaining updated weather data of locations along the travel route and generating an updated weather indicator along the travel route to the destination.

It should be understood that although the method 200 is described as being performed by the navigation system 130, in some examples, such method (i.e., entire or a part of method 200) may be performed by one or more processors of a server (e.g., 150). For example, the server may be associated with a service provider network/system that communicates with the navigation system 130 of the vehicle 120. In such embodiments, a user may communicate with the server via a user's computing device (e.g., 160) to plan a trip to avoid forecasted weather. Yet, in other embodiments, the method 200 (i.e., entire or a part of method 200) may be performed by an application executing on a computing device (e.g., 160). For example, the computing device may be a mobile device of the user.

Referring now to FIGS. 5-8, a computer-implemented method 500 for dynamically navigating around inclement weather is shown. Traditionally, users have attempted to avoid inclement weather by watching the sky or looking at the weather information on users' mobile devices to predict which roads will keep them away from the weather. However, this is generally ineffective and may cause the users to get lost, usually in the dark, then use navigation to get to their destinations later than planned and may end up riding through inclement weather. The navigation system (e.g., 130) disclosed herein allows the users to avoid riding through inclement weather not only to reduce anxiety and stress for the users (e.g., during cross country rides) but also to keep them safe and dry.

In the illustrative embodiment, the method 500 is performed by a navigation system (e.g., 130) of a vehicle (e.g., 120). In block 502, the navigation system 130 receives a destination from a user (e.g., a driver/rider or passenger of the vehicle). In the illustrative embodiment, the destination may be received via a display screen (e.g., 140) and/or a user interface (e.g., 142) of the navigation system 130. However, it should be appreciated that, in some embodiments, the destination may be received via the computing device (e.g., 160) that is communicatively coupled to the navigation system 130.

If the navigation system 130 determines that a destination has not been received in block 504, the method 500 loops back to block 502 to continue waiting for a destination to be received from a user. If, however, the navigation system 130 determines that a destination has been received in block 504, the method 500 advances to block 506.

In block 506, the navigation system 130 determines a travel route to the destination and obtains weather data of locations along the travel route from a server (e.g., 150) and/or a computing device (e.g., 160). As discussed above, the computing device may be a mobile device, a smartphone, a tablet, a computer, a notebook, a laptop, or any other suitable computing device that is communicatively coupled to the navigation system to provide data (e.g., user input, weather data, GPS data, and/or map data).

Subsequently, in block 508, the navigation system 130 determines if inclement weather is expected when the vehicle is travelling along the travel route. In embodiments, this is accomplished by the navigation system 130 determining an approximate time at which the vehicle is expected to reach at certain locations (e.g., major cities, towns, or intersections) along the travel route based on the speed of the vehicle and predicts the future weather at those locations at the corresponding estimated arrival time based on the weather data. In some embodiments, the navigation system 130 may determine the future weather along the travel route and may be updated every predetermined time period (e.g., every 30 minutes). It should be appreciated that, in such embodiments, the predetermined time period may be pre-programmed or may be manually selected by a user. It should be appreciated that the navigation system 130 dynamically updates the expected inclement weather throughout the travel based on the current speed of the vehicle, the current travel route, and the updated weather data. The inclement weather includes, but not limited to, rain, snow, hail, sleet, cold, high wind, dust storm, extreme high/low temperature for a locality concerned, and/or any abnormal or unpleasant climatic condition.

If the navigation system 130 determines that inclement weather is not expected when the vehicle is travelling along the travel route in block 510, the method 500 advances to block 512. In block 512, the navigation system 130 displays on the display screen 140 of the navigation system 130 a map with the travel route to the destination and start navigation along the travel route. In the illustrative embodiment, the navigation system 130 continuously or periodically obtains updated weather data en route, as indicated in block 514. Subsequently, the method 500 loops back to block 508 to continue determining if inclement weather is expected along the travel route based on the updated weather data. In other words, the navigation system 130 continuously or periodically determines if inclement weather is expected along the travel route to determine whether an alternative route is available to avoid the inclement weather.

Referring back to block 510, if the navigation system 130 determines that inclement weather is expected when the vehicle is travelling along the travel route, the method 500 advances to block 516. In block 516, the navigation system 130 displays one or more locations where the inclement weather is expected and queries the user whether to select a different destination. If the navigation system 130 determines that the user has selected a different destination in block 518, the method 500 loops back to block 506 to determine a new travel route to the different destination and obtain weather data of locations along the new travel route.

If, however, the navigation system 130 determines that the user has not selected a different destination or declined to select a different destination, the method 500 advances to block 520 to determines if one or more alternative routes to the destination are available that have an improved characteristic relative to the inclement weather. It should be appreciated that the one or more alternative routes may avoid the inclement weather entirely, have a less chance of encountering the inclement weather, or have shorter duration of expected overlap with the inclement weather. These routes may have less preferred other characteristics, such as travel time and/or arrival time. If the navigation system 130 determines that one or more alternative routes are available in block 522, the method 500 advances to block 524 shown in FIG. 6.

In block 524, the navigation system 130 determines if the one or more alternative routes have an improved characteristic relative to the inclement weather based on the weather data. If the navigation system 130 determines that an alternative route that has an improved characteristic relative to the inclement weather is not available, the method 500 skips ahead to block 542 shown in FIG. 7. If, however, the navigation system 130 determines that there is at least one alternative route that has an improved characteristic relative to the inclement weather, the method 500 advances to block 528. As discussed above, the alternative route that has an improved characteristic relative to the inclement weather may include one or more routes that avoids the inclement weather entirely, have a less chance of encountering the inclement weather, or have shorter duration of expected overlap with the inclement weather.

Figure 18:
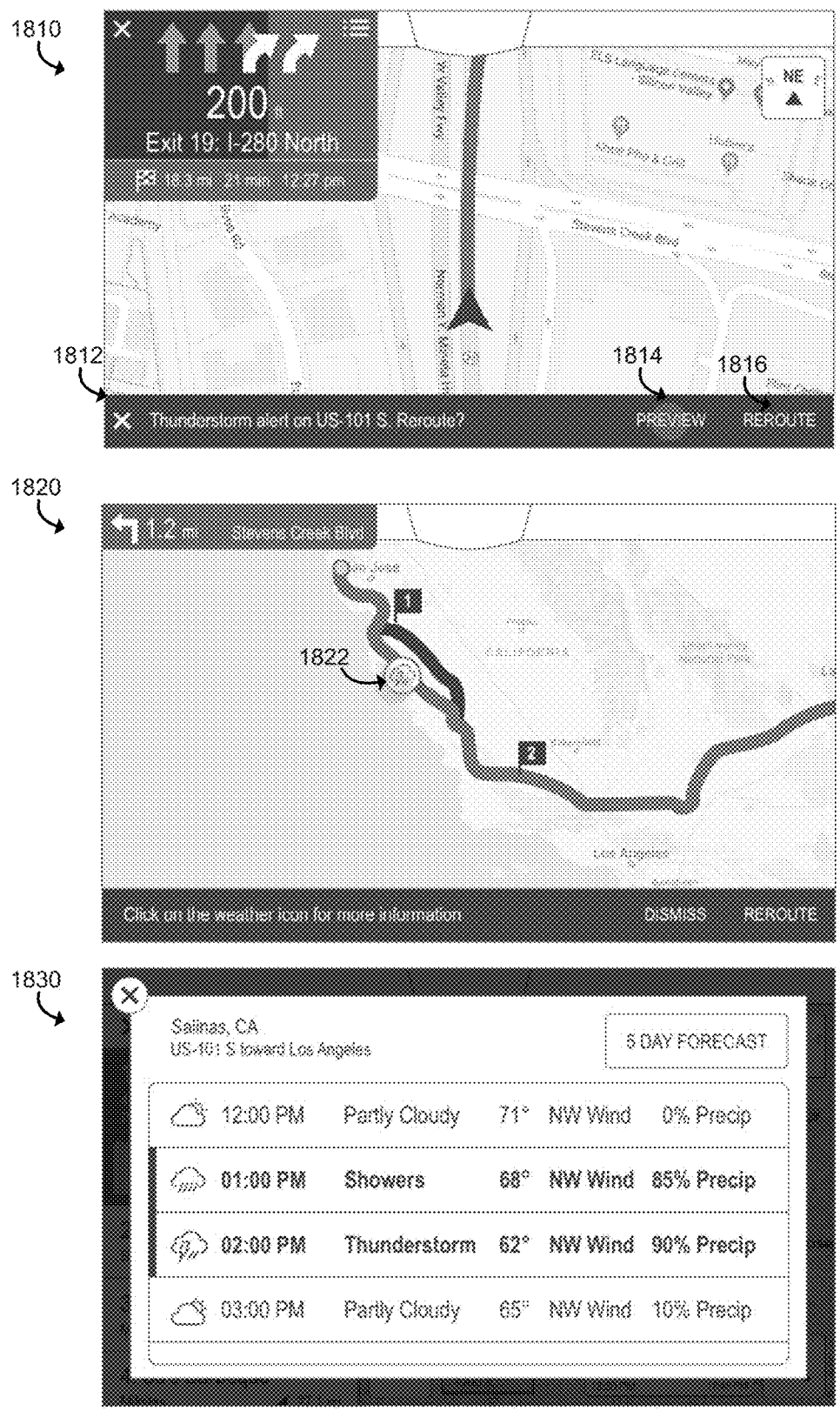
FIG. 18 illustrates example screenshots of the navigation systems of the vehicle for dynamically navigating around inclement weather.

In block 528, the navigation system 130 displays on the display screen the map with the travel route and an alternative route that has an improved characteristic relative to the inclement weather and requests the user whether to accept the alternative route to the destination for navigation. For example, exemplary screenshots 1810, 1820, and 1830 of the display screen of the navigation system 130 are shown in FIG. 18. As shown in the screenshot 1810, the navigation system 130 may alert the user by displaying a notification 1812 on the display screen to indicate that the inclement weather is expected along the travel route. The notification 1812 may further include options for the user to preview the inclement weather on the map by selecting a preview icon 1814 or to reroute to the destination by selecting a reroute icon 1816. In response to determining that the user has selected the preview icon 1814, the navigation system 130 may display an original route 1824 with a weather icon 1822 indicating the location where the inclement weather is expected and an alternative route 1826 to the destination, as illustrated in the screenshot 1820. In the exemplary embodiment, the navigation system 130 provides an option for the user to click the weather icon 1822 to view detailed weather information, as shown in the screenshot 1830. Alternatively, in some embodiments, the navigation system 130 may display the detailed weather information as shown in the screenshot 1830 in response to determining that the user has selected the preview icon 1814. In such embodiments, the user may select a 5-day forecast icon 1832 to view the 5-day weather forecast. Additionally, as shown in the screenshot 1820, the navigation system 130 may provide options for the user to dismiss the inclement weather alert by selecting a dismiss icon 1822 or to reroute to the destination via the alternative route 1826 by selecting a reroute icon 1824. In response to determining that the user has selected the reroute icon 1824, the navigation system 130 starts navigation along the alternative route 1826. It should be appreciated that, in some embodiments, the travel route 1824 and the alternative route(s) 1826 may be color coded to illustrate the inclement weather (e.g., by highlighting a portion of a route in blue to illustrate that rain is expected along that portion of the route). If the user does not accept the alternative route for navigation, the method 500 skips ahead to block 542 shown in FIG. 7. If, however, the user accepts the alternative route, the method 500 advances to block 532 to set the alternative route as a new travel route for navigation. Once the alternative route is set as the new travel route, the navigation system 130 determines a new estimated arrival time to the destination and notifies the user of a new estimated arrival time and a distance according to the new travel route, as indicated in block 534.

It should be appreciated that if there are more than one alternative route that avoid the inclement weather, the navigation system 130 may present the fastest or the shortest route to the user. Alternatively, in some embodiments, the navigation system 130 may present all alternative routes on the map with the travel route to the user and query the user to select one of the alternative routes for navigation.

In the illustrative embodiment, the navigation system 130 provides an option to notify someone that the expected arrival time has been changed. To do so, in block 536, the navigation system 130 queries the user whether to notify someone that the expected arrival time has been changed. If the navigation system 130 determines that a notification request has been received in block 538, the method 500 advances to block 540 to transmit a text message to one or more selected contacts. It should be appreciated that the notification request may include one or more contacts selected by the user to be notified.

Figure 7:
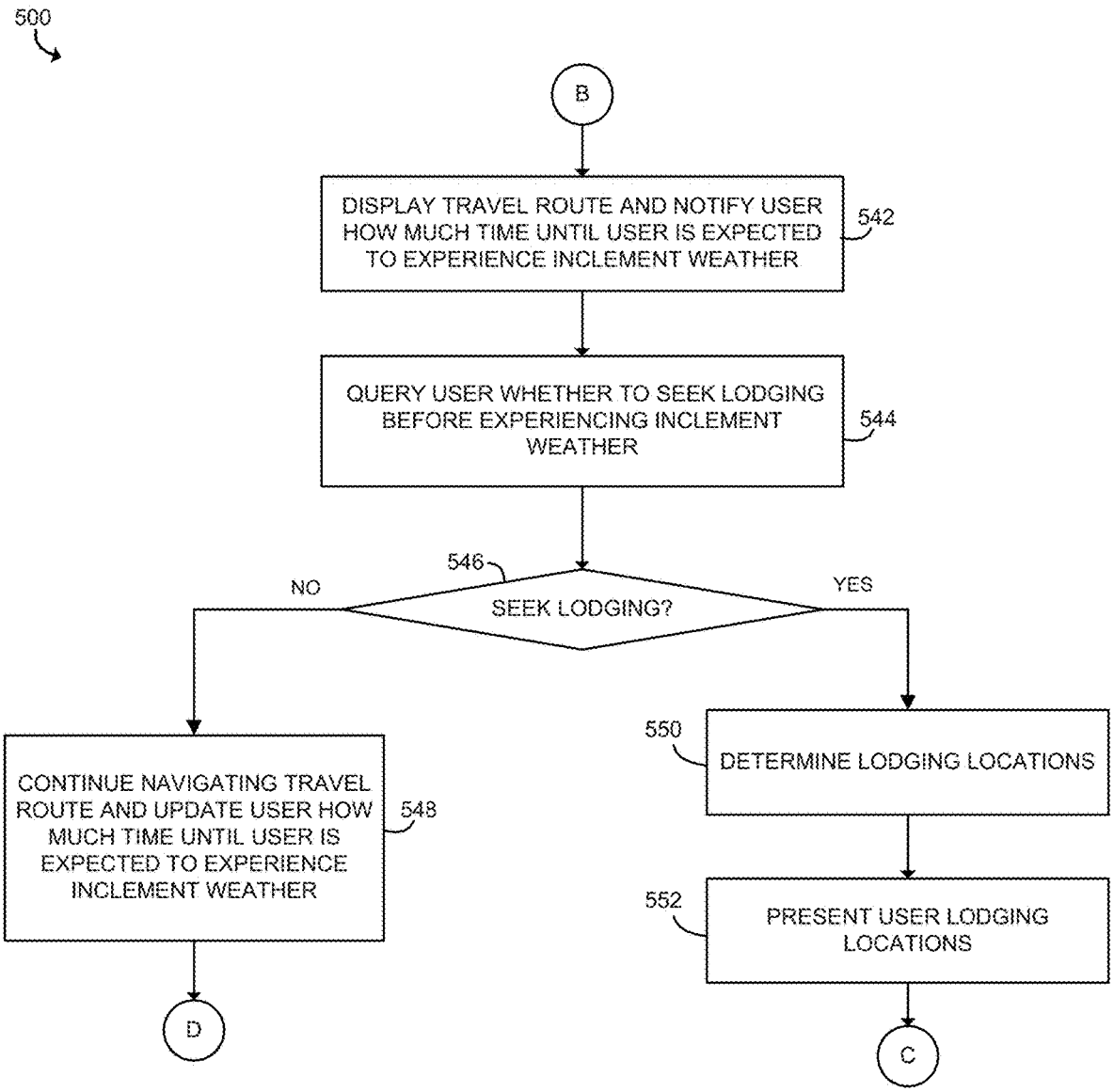
Figure 8:
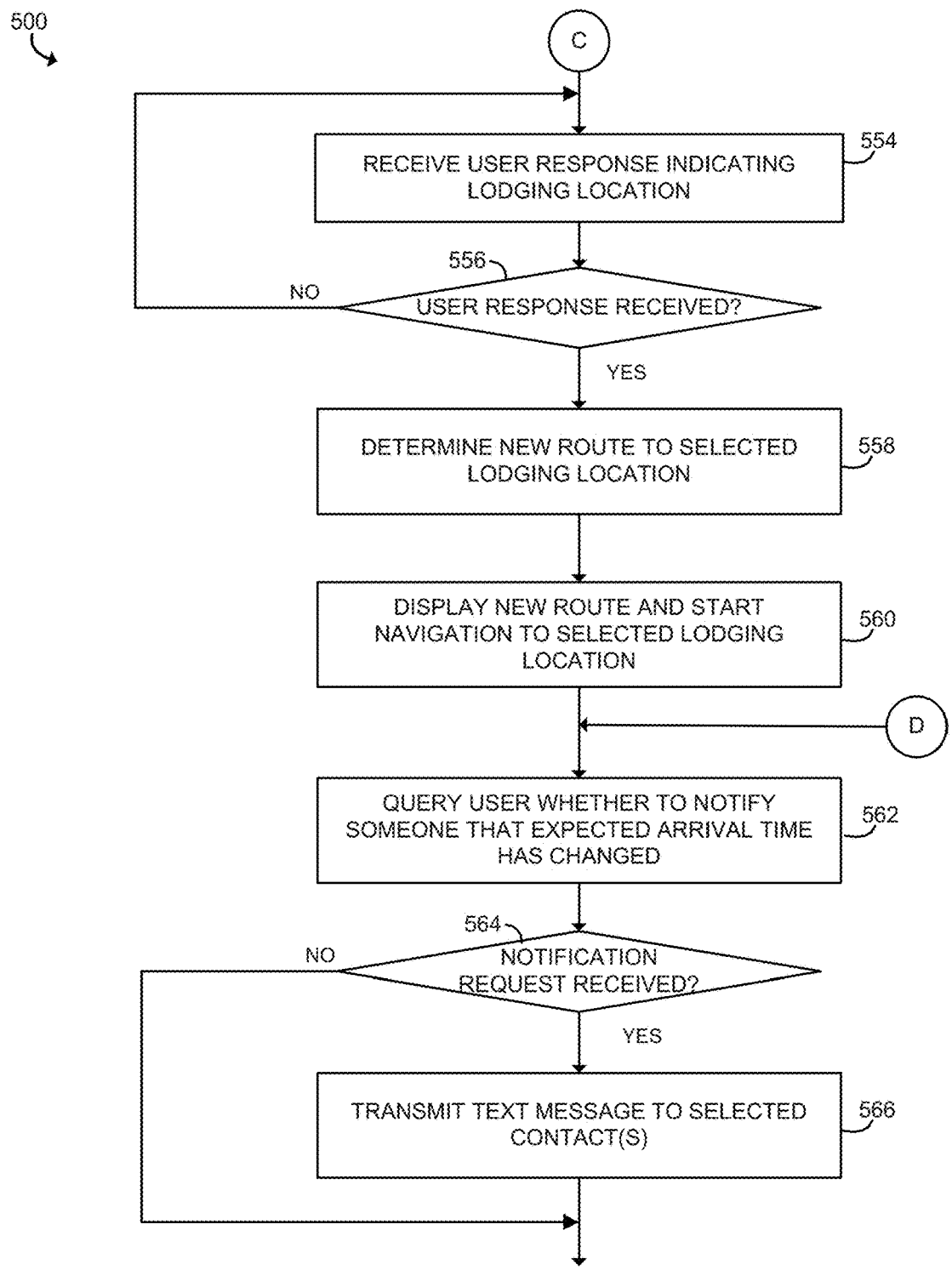

Referring back to block 522, if the navigation system 130 determines that an alternative route to the destination is not available, the method 500 skips ahead to block 542 shown in FIG. 7. In block 542, the navigation system 130 displays on the display screen 140 the map with the travel route and notifies the user how much time the user has until expecting to experience the inclement weather. Subsequently, the navigation system 130 queries the user whether to seek lodging before experiencing the inclement weather, as indicated in block 544. It should be appreciated that, in some embodiments, the navigation system 130 may query the user whether to select a new destination.

If the navigation system 130 determines that the user indicated not to seek lodging (e.g., expressly or implicitly by not responding to the query) in block 546, the method 500 advances to block 548 to continue navigating the travel route and updating the user how much time is left until the user is expected to experience the inclement weather. Subsequently, the method 500 proceeds to block 562 shown in FIG. 8 to query the user whether to notify someone that the expected arrival time has been changed due to the inclement weather.

If, however, the navigation system 130 determines that the user requested to seek lodging in block 546, the method 500 advances to block 550 to determine one or more lodging locations. The navigation system 130 then presents the lodging locations to the user on the display screen 140, as indicated in block 552. Subsequently, the method 500 proceeds to block 554 in FIG. 8.

In block 554, the navigation system 130 receives a response from the user confirming a lodging location from the lodging locations that were presented to the user. If the navigation system 130 determines that a user response has not been received in block 556, the method 500 loops back to block 554 to continue waiting for a response. If, however, the navigation system 130 determines that a user response has been received in block 556, the method 500 advances to block 558.

In block 558, the navigation system 130 determines a new route to the selected lodging location. Subsequently, the navigation system 130 displays on the display screen 140 the map with the new route and start navigation to the selected lodging location, as indicated in block 560.

In block 562, the navigation system 130 queries the user whether to notify someone that the expected arrival time has been changed. If the navigation system 130 determines that a notification request has been received in block 564, the method 500 advances to block 566 to transmit a text message to one or more selected contacts. It should be appreciated that the notification request may include one or more contacts selected by the user to be notified.

It should be understood that although the method 500 is described as being performed by the navigation system 130, in some examples, such method (entire or a part of method 500) may be performed by one or more processors of a server (e.g., 150). For example, the server may be associated with a service provider network/system that communicates with the navigation system 130 of the vehicle 120. In such embodiments, a user may communicate with the server via a user's computing device (e.g., 160) to plan a trip to avoid the inclement weather. Yet, in other embodiments, the method 500 (i.e., entire or a part of method 500) may be performed by an application executing on a computing device (e.g., 160). For example, the computing device may be a mobile device of the user.

Figure 9:
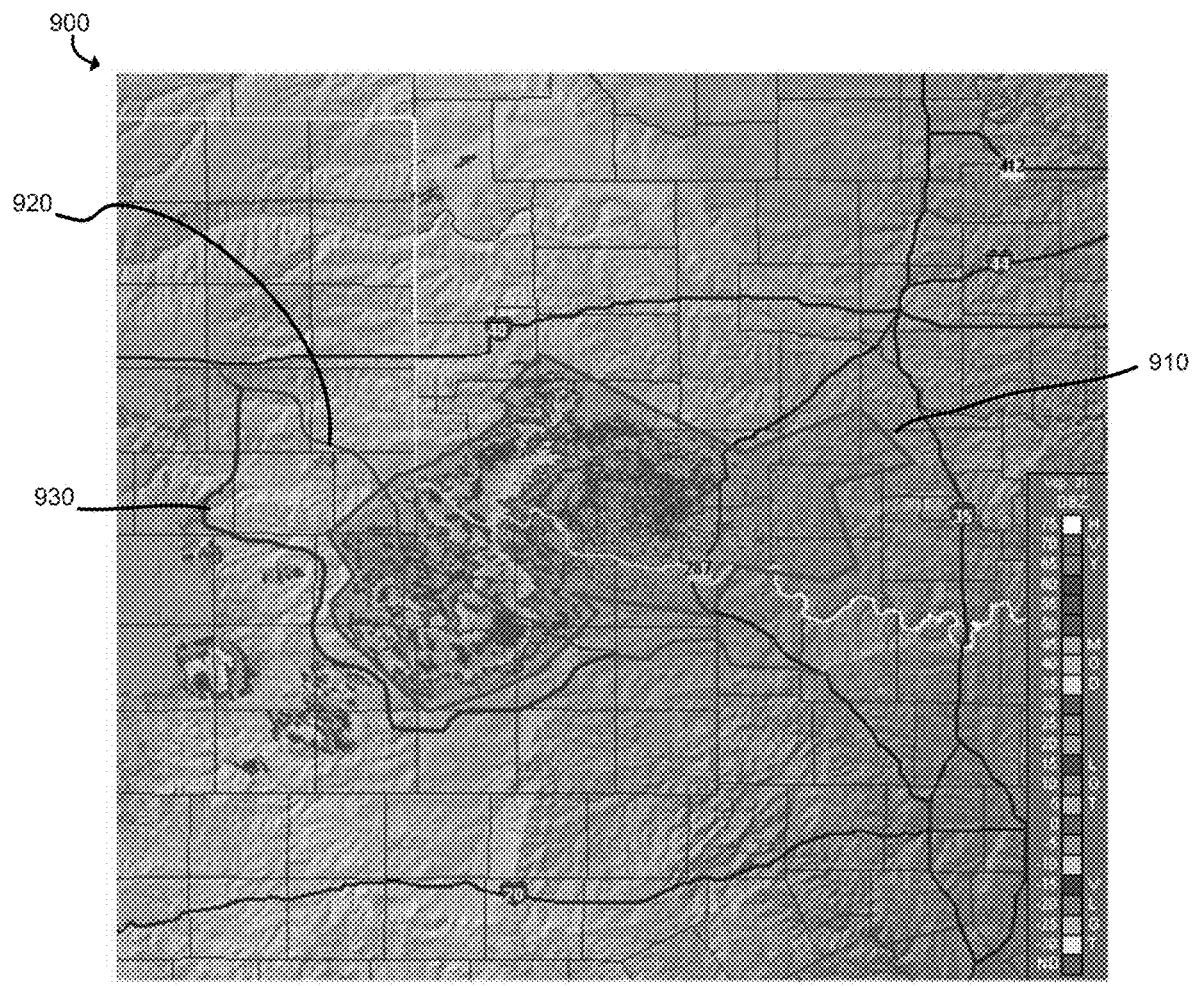
FIG. 9 is an example screenshot of the display screen of the navigation system illustrating a map with a region of inclement weather, a primary route, and an alternative route that avoids the region of inclement weather.

Referring now to FIG. 9, an example map 900 that may be displayed on the display screen 140 of the navigation system 130 is shown. As described above, the navigation system (e.g., 130) is capable of overlaying weather data on a map and navigating around predicted inclement weather based on the weather data. For example, when a user (e.g., a driver/rider of a vehicle) is using the navigation system 130, the navigation system 130 overlays weather maps on a travel route 920. Based on the weather maps, the navigation system 130 determines whether inclement weather is expected to interfere with the travel route 920. To do so, the navigation system 130 identifies forecasted inclement weather on the map by tracing a boundary 910 around the inclement weather. It should be appreciated that, although only one boundary 910 is shown on the map 900, there may be multiple boundaries indicated on the map 900. Additionally, it should be appreciated that, in some embodiments, the boundary or boundaries may not be visible to the user.

Subsequently, the navigation system 130 may determine if the travel route intersects with the boundary to predict whether the inclement weather patterns will cross the user's travel route. If intersection is detected, the navigation system 130 may alert the user and ask the user if he/she would like to use a different route to avoid the inclement weather. If the user indicates that the user wants to user the different route to keep the user out of the weather, the navigation system 130 may calculate an alternative route that avoids intersection. In this example, a portion of the boundary 910 does cross the travel route 920, indicating that the inclement weather is expected to be on the travel route 920. In response, the navigation system 130 determines an alternative route 930 that avoids the inclement weather and presents the alternative route 920 to the user.

As described above, if the inclement weather is unavoidable, the navigation system 130 may ask the user if the user would like to select a different destination or find lodging or a safe area to wait out the weather. If the user would like to route to a different destination, the navigation system 130 may look up points of interest that are not expected to encounter inclement weather for a given period of time (e.g., for next 12 hours).

Figure 10:
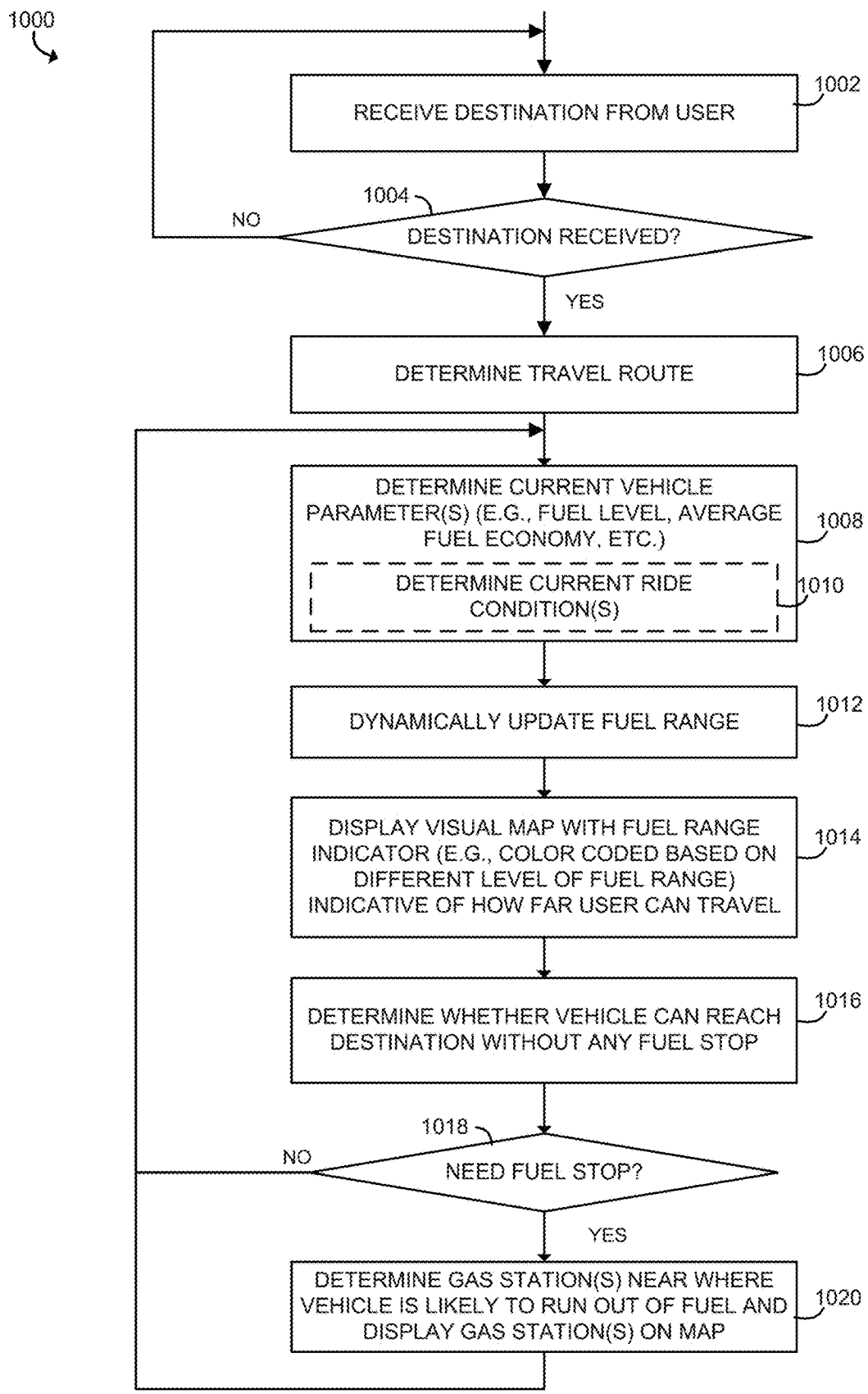
FIG. 10 is a flow diagram illustrating a computer-implemented method for dynamically generating a map with fuel range indicator.

Referring now to FIG. 10, a computer-implemented method 1000 for dynamic fuel range mapping is shown. Dynamic fuel range mapping allows the user to dynamically and visually track fuel range during and prior to starting a ride. During a ride, the fuel range is dynamically updated and adjusted in near real-time based on at least one of current vehicle parameters, current ride conditions, and how the vehicle is being driven. Prior to starting a ride, dynamic fuel range mapping may be used while creating a desired travel route to help determine fuel stops and to understand if a ride is possible to complete. If the user choses to route a particular direction and will run out of fuel before reaching the destination, the navigation system (e.g., 130) will suggest the nearest gas station along the travel route before running out of fuel. As such, by visually displaying fuel range along a travel route, the users may more accurately and confidently plan their ride.

In the illustrative embodiment, the method 1000 is performed by a navigation system (e.g., 130) of a vehicle (e.g., 120). In block 1002, the navigation system 130 receives a destination from a user (e.g., a driver/rider or passenger of the vehicle). In the illustrative embodiment, the destination may be received via a display screen (e.g., 140) and/or a user interface (e.g., 142) of the navigation system 130. However, it should be appreciated that, in some embodiments, the destination may be received via the computing device (e.g., 160) that is communicatively coupled to the navigation system 130. As discussed above, the computing device may be a mobile device, a smartphone, a tablet, a computer, a notebook, a laptop, or any other suitable computing device that is communicatively coupled to the navigation system to provide data (e.g., user input, weather data, GPS data, and/or map data).

If the navigation system 130 determines that a destination has not been received in block 1004, the method 1000 loops back to block 1002 to continue waiting for a destination to be received from a user. If, however, the navigation system 130 determines that a destination has been received in block 1004, the method 1000 advances to block 1006.

In block 1006, the navigation system 130 determines a travel route to the destination. Subsequently, the navigation system 130 determines one or more current vehicle parameters, as indicated in block 1008. The current vehicle parameters may include a fuel level percentage and average fuel economy. The fuel level percentage indicates a percentage of fuel left in a fuel tank of the vehicle. The fuel includes any suitable type of vehicle fuel, such as liquid fuel (e.g., gasoline or diesel fuel), gaseous fuel (e.g., hydrogen, natural gas, propane, butane, or any other gas that may be used in place of the liquid fuel), or mixture thereof. The average fuel economy may be based on fuel economy history data of the vehicle (i.e., how far the vehicle has travelled on average with the current fuel level of the vehicle). Additionally or alternatively, the average fuel economy may be determined based on the make, model, year, and/or maintenance history of the vehicle. In some embodiments, the navigation system 130 may also determine one or more current ride conditions, as indicated in block 1010. The vehicle parameters may further include vehicle historical data, a fuel type, a fuel injector flow rate, a throttle position, a throttle rate of change, and/or a vehicle elevation. The current ride conditions may include weather and road condition. It should be appreciated that, in some embodiments, the navigation system 130 may perform blocks 1006, 1008, and/1010 simultaneously.

Figure 11:
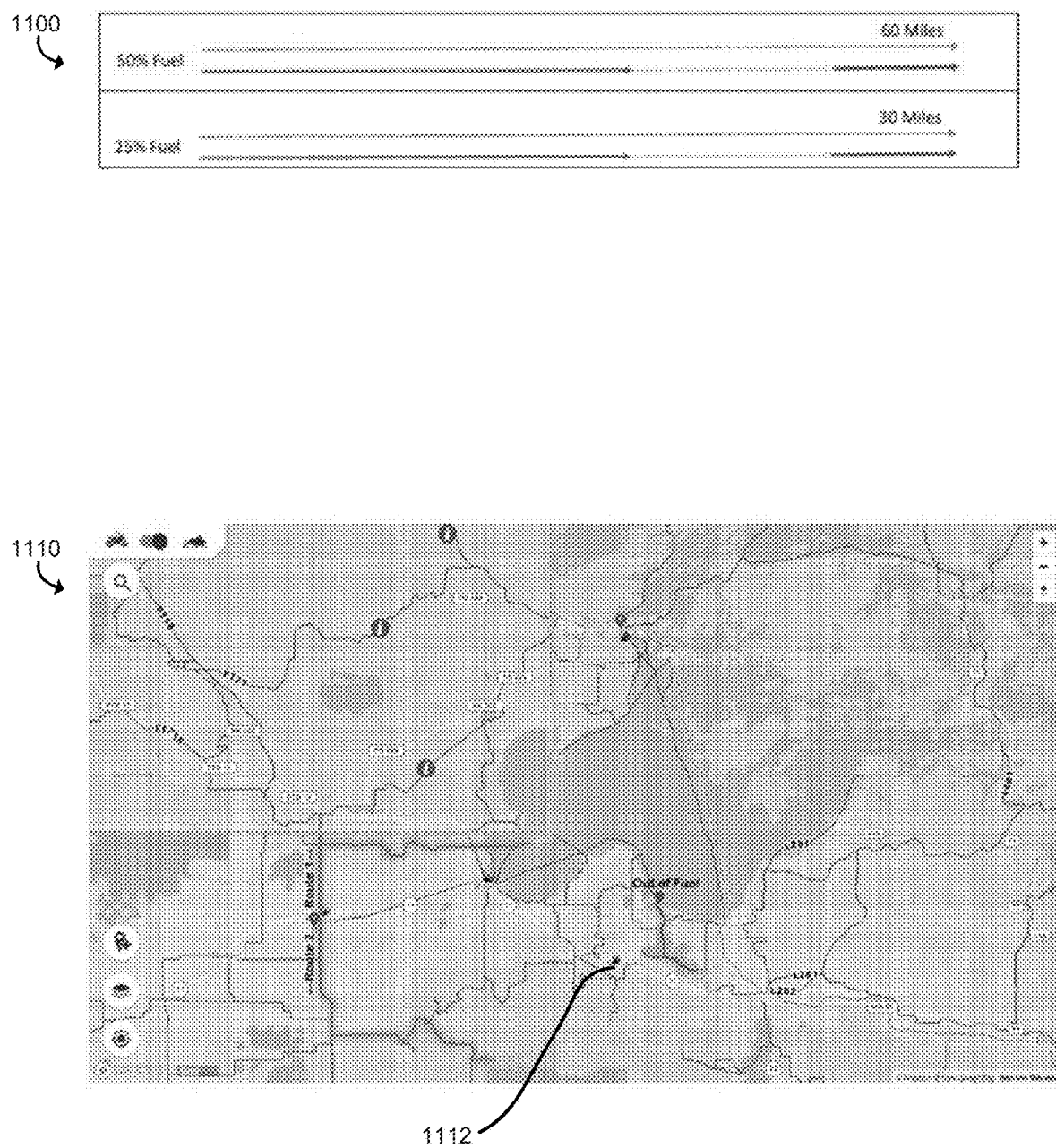
FIG. 11 illustrates example fuel ranges of the vehicle and an example screenshot of the display screen of the navigation system displaying a map with travel routes with the fuel range indicator.
Figure 12:
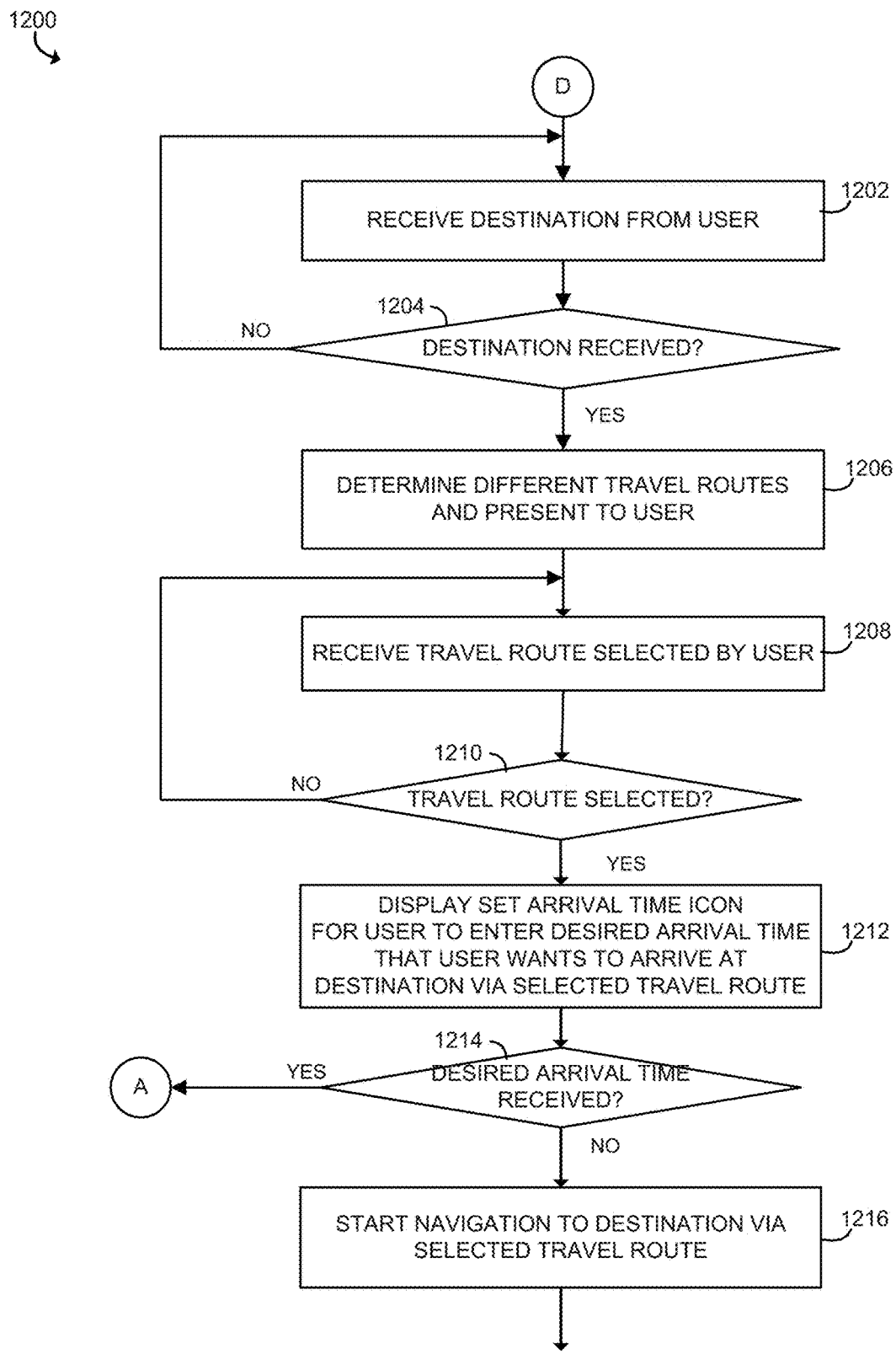
FIGS. 12-15 are a flow diagram illustrating a computer-implemented method for setting delayed-start navigation to arrive at a destination on time.

In block 1012, the navigation system 130 dynamically updates a fuel range based on the one or more current vehicle parameters. In some embodiments, the navigation system 130 may dynamically update a fuel range based on the one or more current vehicle parameters and the one or more current ride conditions. The fuel range indicates approximately how far the vehicle can travel with the current fuel level. For example, as illustrated in FIG. 11, an example 1100 indicates that with 50% of fuel left in the fuel tank of the vehicle, the vehicle can travel for about 60 miles before the vehicle needs refueling (i.e., the fuel range is 60 miles). With 25% of fuel left in the fuel tank of the vehicle, the fuel range drops to about 30 miles.

Subsequently, in block 1014, the navigation system 130 displays on a display screen 140 of the navigation system 130 a map with the travel route to the destination with a fuel range indicator indicating a different level of fuel range (e.g., high, medium, low). For example, the fuel range indicator may be color coded based on a different level of fuel range. As illustrated in FIG. 11, the estimated fuel range may be shown with a green, yellow, and red highlighted line over the travel route on the map. The green fuel indicator represents that the fuel level is above a first threshold fuel level (e.g., ≥70% of fuel indicating that the fuel level is high), the yellow fuel indicator represents that the fuel level is below the first threshold fuel level but above a second threshold fuel level (e.g., between 30-70% of fuel indicating that the fuel level is medium), and the red fuel indicator represents that the fuel level is below the second threshold fuel level (e.g., ≤30% of fuel indicating that the fuel level is low).

In block 1016, the navigation system 130 determines whether the vehicle can reach the destination without a fuel stop. If the navigation system 130 determines that the vehicle can reach the destination without a fuel stop in block 1018, the method 1000 loops back to block 1008 to determine if there is any change to the fuel range of the vehicle based on the updated vehicle parameters and/or the updated ride conditions.

If, however, the navigation system 130 determines that the vehicle needs a fuel stop before reaching the destination in block 1018, the method 1000 advances to block 1020 to determine one or more gas stations along or near the travel route where the vehicle is likely to run out of fuel. The navigation system 130 displays on the display screen 140 the map with the one or more gas stations near the travel route. It should be appreciated that, in some embodiments, the navigation system 130 may choose the gas station that is nearest to the travel route before the fuel runs out. In other embodiments, the user may choose a gas station from the one or more possible gas stations near or along the travel route that the user wants to stop before reaching the destination. In response, the navigation system 130 adds a new stop to the destination and loops back to block 1008 to update the fuel range indicator based on the added stop to the destination, the updated vehicle parameters, and/or the updated ride conditions.

Referring back to the screenshot 1110 of FIG. 11, if the user chooses Route 1, a user is able to make it to the destination without needing to stop for fuel. However, if the user chooses Route 2, the user is notified of a gas station 1112 near Route 2 for fuel before reaching the destination. Once the user decides to stop at the gas station 1112, the navigation system 130 reroute Route 2 to add a new stop and to continue route to the destination.

It should be appreciated that, in some embodiments, the vehicle may be an electric vehicle that has a battery that requires charging. In such embodiments, the navigation system 130 may present the user of the electric vehicle a similar map as shown in FIG. 11 but to indicate a battery life remaining of the electric vehicle and electric charging stations along the travel route(s). It should be appreciated that the battery life may depend on the current/estimated speed of the electric vehicle and/or weather parameters. The navigation system 130 may determine the remaining battery life of the electric vehicle and notify the user whether the user can reach the destination based on the remaining battery life. If the navigation system 130 determines that charging is required to reach the destination, the navigation system 130 may re-route the vehicle to a nearest or most convenient charging station on the travel route. However, if the user is riding the electric vehicle without a destination, the navigation system 130 may indicate one or more nearby charging stations on a display screen of the navigation system that are accessible to the user regardless of the status of the battery life of the electric vehicle.

In some embodiments, the navigation system 130 may communicate with other navigation systems of another electric vehicles. In such embodiments, if the navigation system 130 determines that there is no charging station nearby or it is inconvenient or impractical for the electric vehicle to travel to a charging station, the navigation system may alert another electric vehicle to come and assist the charging of the electric vehicle.

In some embodiments, the electric vehicle may include a battery maintaining system to control performance of the electric vehicle. In such embodiments, the navigation system 130 may communicate with the battery maintaining system to switch to a battery saving mode to limit performance of the electric vehicle (i.e. lower maximum speeds, limiting specific accessory usages, such as audio, lighting, charging ports, and controller area network (CAN) bus accessories) based on the remaining battery life, a location of nearest charging station, and/or a location of the destination.

It should be understood that although the method 1000 is described as being performed by the navigation system 130, in some examples, such method (entire or a part of method 1000) may be performed by one or more processors of a server (e.g., 150). For example, the server may be associated with a service provider network/system that communicates with the navigation system 130 of the vehicle 120. In such embodiments, a user may communicate with the server via a user's computing device (e.g., 160) to plan a trip. Yet, in other embodiments, the method 1000 (i.e., entire or a part of method 1000) may be performed by an application executing on a computing device (e.g., 160). For example, the computing device may be a mobile device of the user.

Referring now to FIGS. 12-15, a computer-implemented method 1200 for setting delayed-start navigation to arrive at a destination on time is shown. In the illustrative embodiment, the method 1200 is performed by a navigation system (e.g., 130) of a vehicle (e.g., 120). To do so, in block 1202, the navigation system 130 receives a destination from a user (e.g., a driver/rider or passenger of the vehicle). In the illustrative embodiment, the destination may be received via a display screen (e.g., 140) and/or a user interface (e.g., 142) of the navigation system 130. However, it should be appreciated that, in some embodiments, the destination may be received via the computing device (e.g., 160) that is communicatively coupled to the navigation system 130. As discussed above, the computing device may be a mobile device, a smartphone, a tablet, a computer, a notebook, a laptop, or any other suitable computing device that is communicatively coupled to the navigation system to provide data (e.g., user input, weather data, GPS data, and/or map data).

If the navigation system 130 determines that a destination has not been received in block 1204, the method 1200 loops back to block 1202 to continue waiting for a destination to be received from a user. If, however, the navigation system 130 determines that a destination has been received in block 1204, the method 1200 advances to block 1206.

In block 1206, the navigation system 130 determines different travel routes to the destination and displays on a display screen (e.g., 140) a map with the different travel routes to the destination. Subsequently, in block 1208, the navigation system 130 receives a travel route selected by the user.

If the navigation system 130 determines that the user has not selected a travel route to the destination, the method 1200 loops back to block 1208 to continue waiting for a travel route to be selected by the user. If, however, the navigation system 130 determines that a travel route has been selected by the user, the method 1200 advances to block 1212.

In block 1212, the navigation system 130 displays an icon for the user to select to enter a desired arrival time that the user wants to arrive at the destination via the selected travel route. If the navigation system 130 determines that the desired arrival time has not been received in block 1214, the method 1200 advances to block 1216 to start navigation to the destination via the selected travel route.

Figure 13:
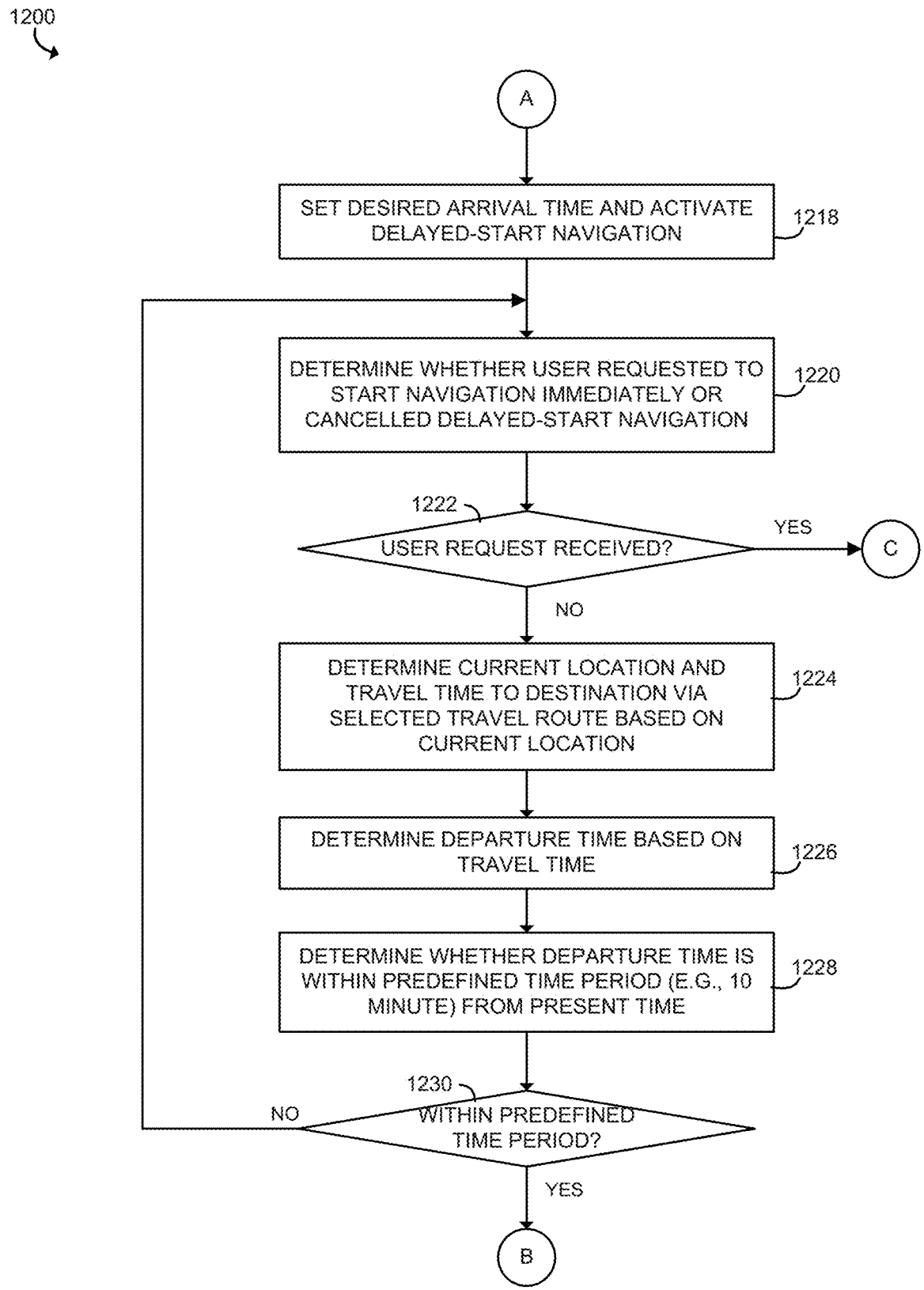

If, however, the navigation system 130 determines that the desired arrival time has been received, the method 1200 skips ahead to block 1218 shown in FIG. 13. In block 1218, the navigation system 130 sets the desired arrival time and activates delayed-start navigation.

Subsequently, the navigation system 130 determines whether the user requested to start navigation immediately or cancelled the delayed-start navigation. If the navigation system 130 determines that such request has been received in block 1222, the method skips ahead to block 1240 shown in FIG. 15 to determine whether the user requested to cancel the delayed-start navigation. If the navigation system 130 determines that the user requested to cancel the delayed-start navigation in block 1240, the method 1200 advances to block 1242 to cancel the delayed-start navigation and loops back to block 1202 to receive a new destination from the user. If, however, the navigation system 130 determines that the user did not request to cancel the delayed-start navigation in block 1240, the method 1200 advances to block 1244 to start the navigation to the destination via the selected travel route immediately.

Referring back to block 1222, if the navigation system 130 determines that the request to start navigation immediately or cancelled the delayed-start navigation has not been received, the method 1200 advances to block 1224. In block 1224, the navigation system 130 determines the current location and travel time to the destination via the selected travel route based on the current location. The travel time indicates approximate time that the vehicle needs to travel from the current location to the destination via the selected travel route at the present time. In the illustrative embodiment, the navigation system 130 takes traffic along the selected travel route into account when determining the travel time. The traffic data may be continuously or periodically received from a server (e.g., 150) and/or a computing device (e.g., 160).

Subsequently, in block 1226, the navigation system 130 determines departure time based on the travel time. The departure time indicates when the user needs to leave to the destination in order to arrive on time (i.e., at the desired arrival time). The navigation system 130 further determines whether the departure time is within a predefined time period (e.g., 5 or 10 minutes) from the present time. If the navigation system 130 determines that the departure time is not within the predefined time period in block 1230, the method 1200 loops back to block 1220 to continue (i) determining whether the user requested to start the navigation immediately or cancelled the delayed-start navigation and (ii) updating the departure time based on the new current location and updated travel time to determine whether updated departure time is within the predefined time period.

Figure 14:
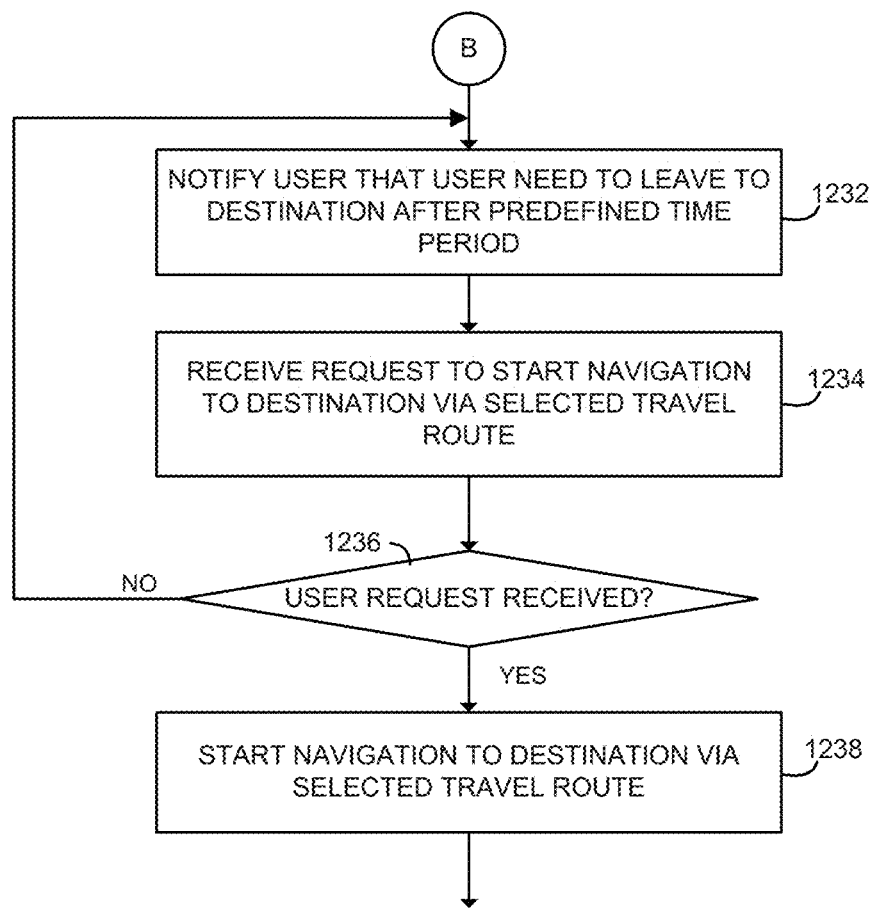
Figure 15:
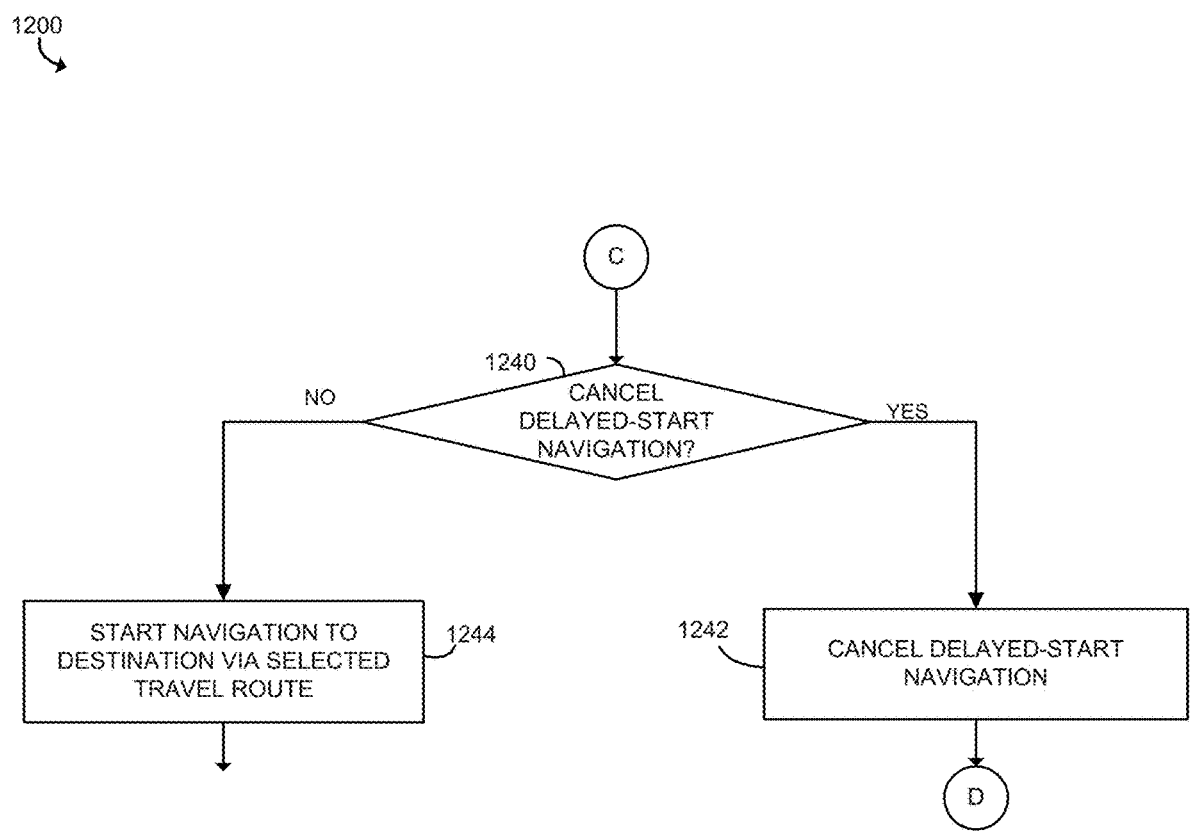

If, however, the navigation system 130 determines that the departure time is within the predefined time period in block 1230, the method 1200 advances to block 1232 shown FIG. 14. In block 1232, the navigation system 130 notifies the user that the user needs to leave to the destination after the predefined time period. Subsequently, the navigation system 130 receives a request from the user to start the navigation to the destination via the selected travel route, as indicated in block 1234. If the navigation system 130 determines that the navigation request has not been received in block 1236, the method 1200 loops back to block 1232 to continue notifying the user that it is time to leave to the destination. It should be appreciated that, in some embodiments, the navigation system 130 may provide a snooze feature, which allows the user to snooze or delay the navigation for a predefined period of time. If, however, the navigation system 130 determines that the navigation request has been received, the method 1200 advances to block 1238 to start the navigation to the destination via the selected travel route from the current location. Yet, in other embodiments, the method 1200 (i.e., entire or a part of method 1200) may be performed by an application executing on a computing device (e.g., 160). For example, the computing device may be a mobile device of the user.

Figure 16:
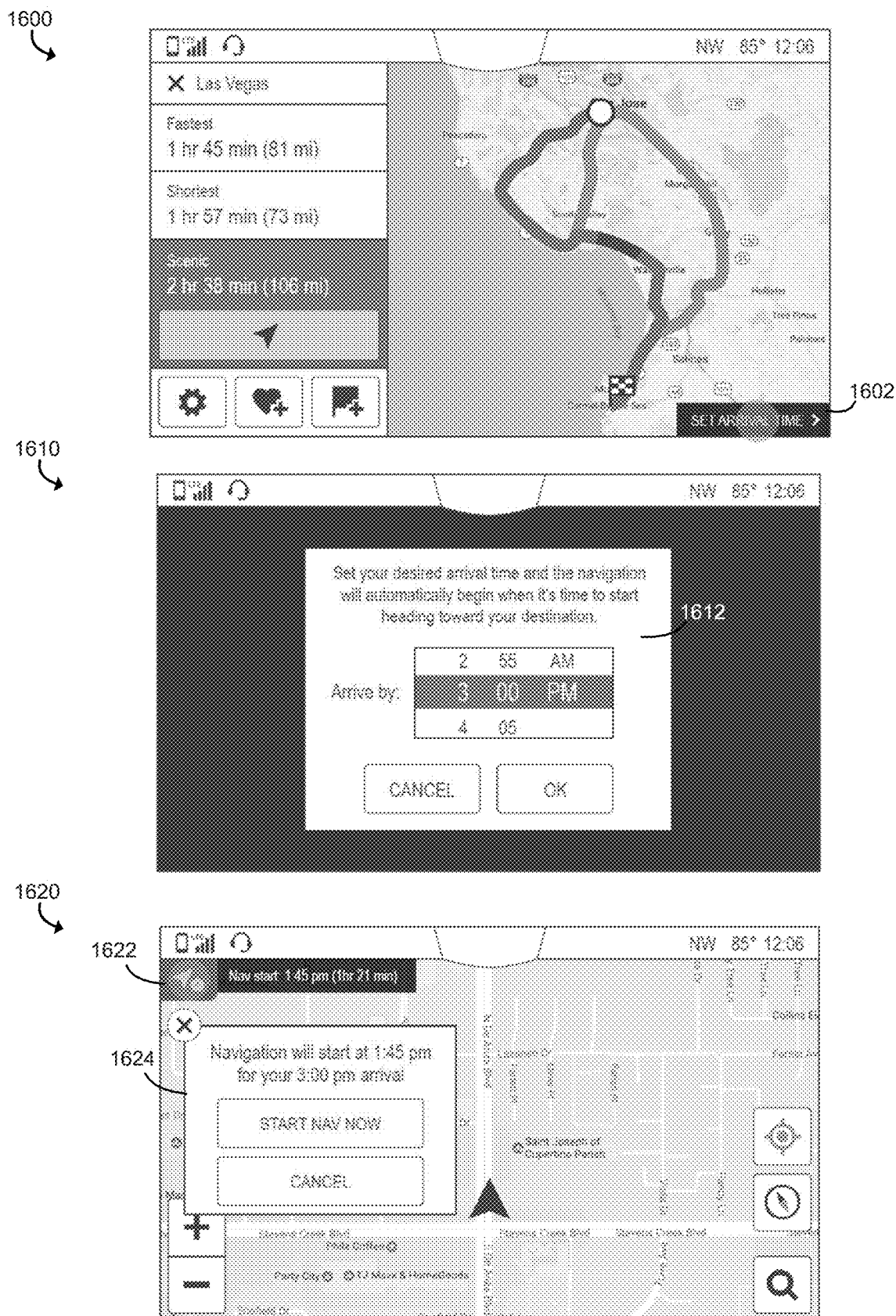
FIG. 16 is example screenshots of the display screen of the navigation system illustrating the delayed-start navigation feature.

For example, FIG. 16 illustrates example screenshots 1600, 1610, 1620 of a display screen 140 of the navigation system 130. As shown in the screenshot 1600, three different travel routes were presented to the user and the user selected Scenic route as the travel route. The user may then select a set arrival time icon 1602 by tapping on the set arrival time icon 1602 to set a desired arrival time. When the set arrival time icon 1602 is selected, a time selector 1612 may pop up on the display screen 140 for the user to enter desired arrival time, as shown in the screenshot 1610. In this example, the user selected 3:00 PM as the desired arrival time.

The presence of a delayed-start navigation icon 1622 in the screenshot 1620 indicates that the desired arrival time has been set. It also displays departure time and travel time next to the delayed-start navigation icon 1622. "Nav start: 1:45 pm (1 hr 21 min)" indicates that the departure time is 1:45 PM and the expected travel time is 1 hour and 21 minutes. If the user selects the delayed-start navigation icon 1622, a pop-up screen 1624 appears indicating that "Navigation will start at 1:45 pm for your 3:00 pm arrival" based on the current location and presents options to start the navigation immediately or cancel the delay-start navigation.

It should be appreciated that, in the illustrative embodiment, the display screen is a touch screen. It should be appreciated that the user may select the set arrival time icon 1602 or enter user inputs to the navigation system 130 via alternative user interface of the navigation system 130 and/or a computing device (e.g., 160).

Figure 17:
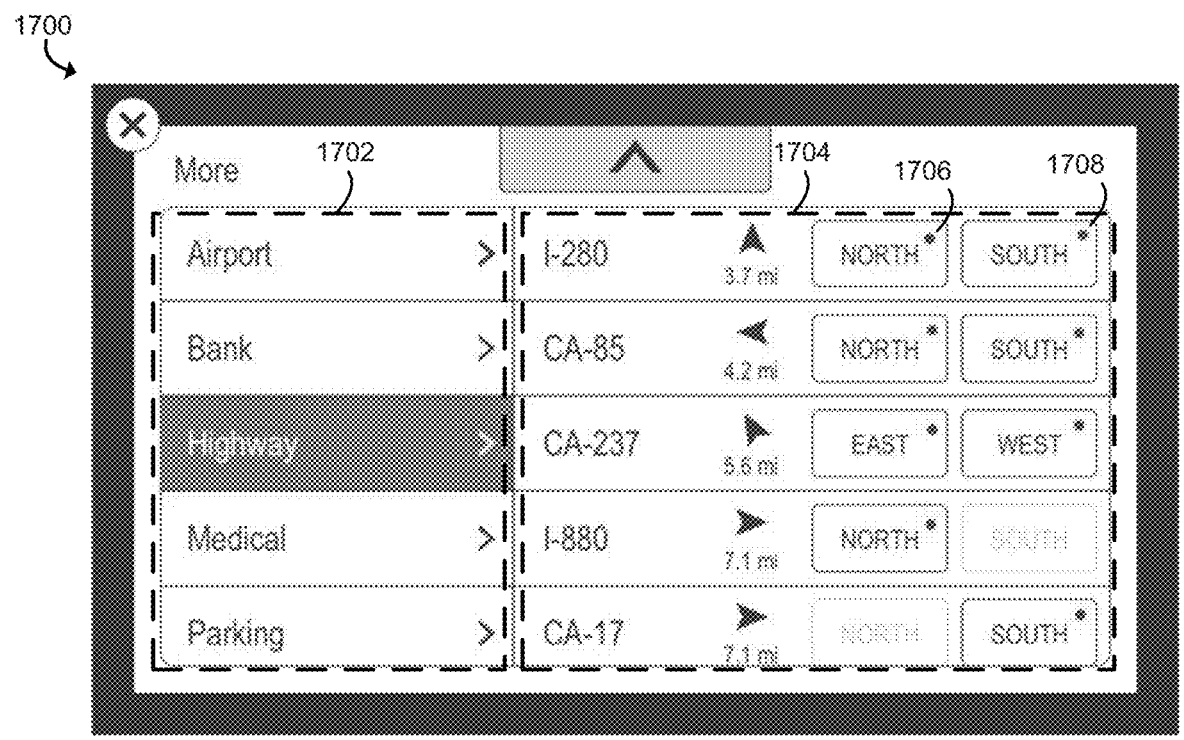
FIG. 17 illustrates an example screenshot of the navigation system of the vehicle for navigating away from congested traffic.

Referring now to FIG. 17, an example screenshot 1700 of a display screen of the navigation system (e.g., 130) of a vehicle (e.g., 120) navigating away from congested traffic is shown. To do so, the navigation system 130 monitors traffic patterns and calculates various routes to display a shortcut to a local freeway ramps with traffic indicators. In embodiments, traffic information may be provided by retrieving traffic information, such as traffic volume and/or traffic speed, from a traffic server, such as from a third party service. For example, the navigation system may provide a list of places 1702 (e.g., airport, bank, highway, medical, and parking). Those places may be pre-programmed by default to common or popular places that users are likely to search for. Alternatively or additionally, the list of places may be customized to places that the user(s) of the vehicle previously searched for. As shown in the screenshot 1700, if the user selects "Highway" from the list 1702, a list of nearby highways 1704 appears on the right side of the list 1702. For each highway, the navigation system determines a distance to the nearest on-ramp and its approximate direction from the current location of the vehicle are indicated. If the highway has more than one route (e.g., northbound/southbound or eastbound/westbound), the navigation system also shows the highway route options, as indicated as "NORTH," "SOUTH," "EAST," and "WEST". For example, as shown in the screenshot 1700, the nearest on-ramp to I-280 is about 3.7 miles north from the current location of the vehicle and the user has an option to get on either northbound or southbound. In the illustrative embodiment, the navigation system further determines a traffic condition of each highway route and indicates on the display screen of the navigation system with a color indicator (e.g., a green indicator 1704 to indicate light traffic, a red indicator 1706 to indicate congested traffic).

Figure 19:
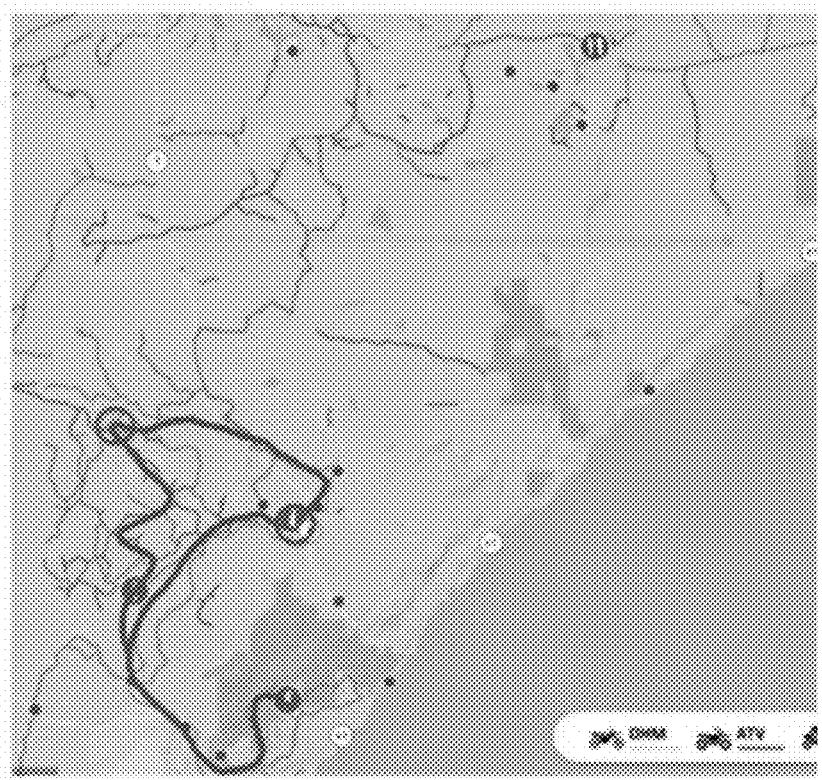
FIGS. 19 and 20 are a flow diagram illustrating a computer-implemented method for providing route recommendations to an available or accessible waypoint.
Figure 19:
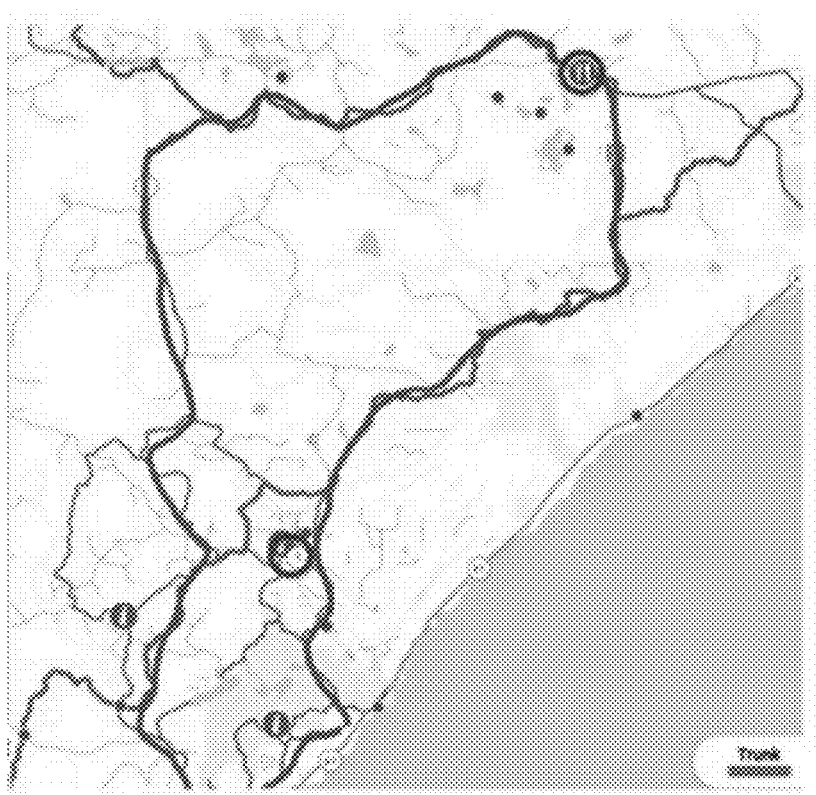
Figure 20:
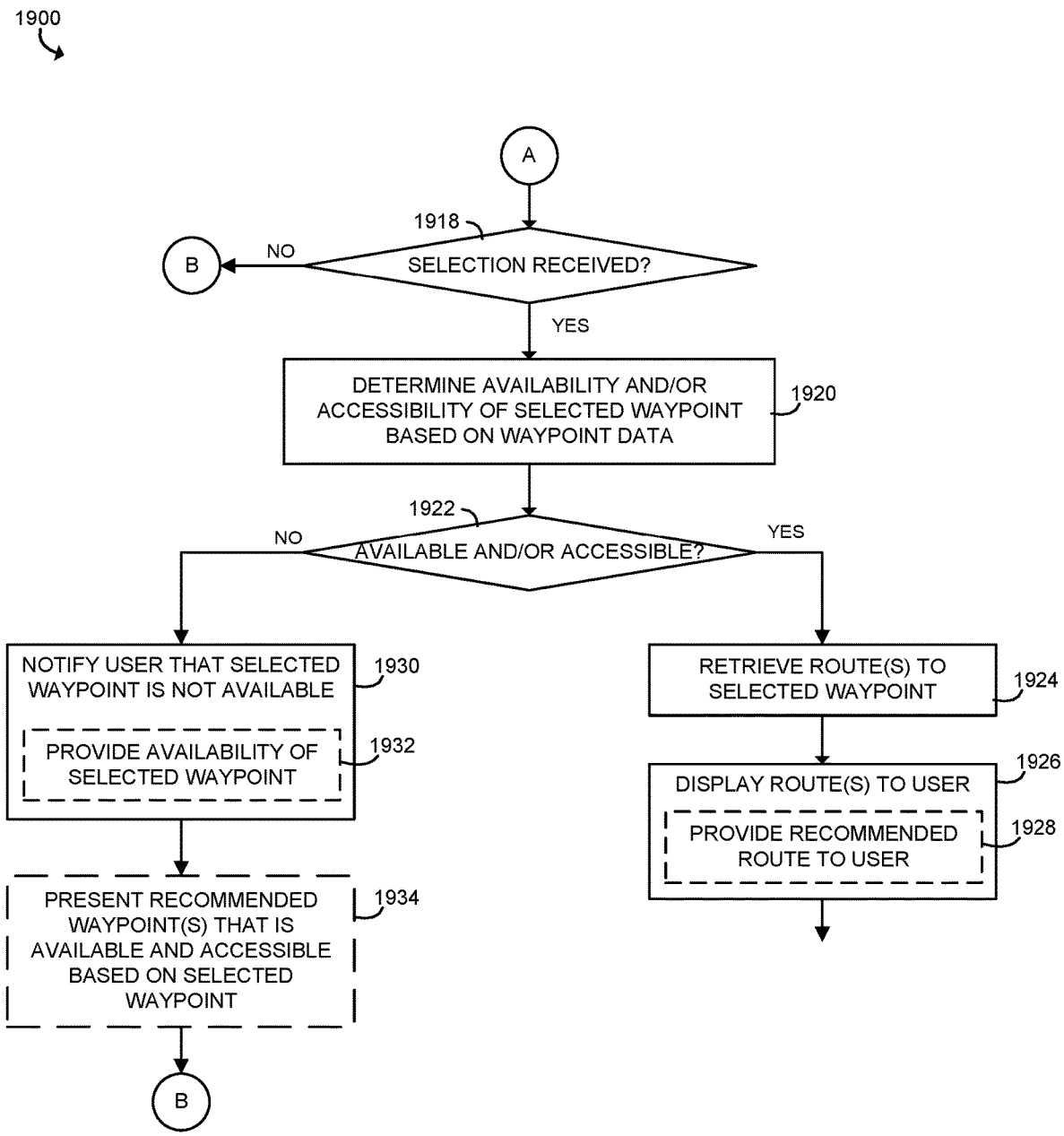

Referring now to FIGS. 19 and 20, a computer-implemented method 1900 for providing route recommendations to available or accessible waypoints is shown. In the illustrative embodiment, the method 1900 is performed by a navigation system (e.g., 130) of a vehicle (e.g., 120). However, it should be appreciated that, in some embodiments, the method 1900 may be performed by a computing device (e.g., 160). As discussed above, the computing device may be a mobile device, a smartphone, a tablet, a computer, a notebook, a laptop, or any other suitable computing device that is communicatively coupled to the navigation system to provide data (e.g., user input, weather data, GPS data, and/or map data).

To do so, in block 1902, the navigation system 130 obtains time availability or accessibility information for waypoints. In some embodiments, the time availability or accessibility information may be received from users (e.g., user feedback), as indicated in block 1904. For example, users may provide feedback during or after rides whether one or more waypoints were available during the rides. Additionally or alternatively, the navigation system 130 may prompt one or more questions to the users to gather availability or accessibility information. For example, the prompt may include "Was this destination open?" or "Were you able to access this destination?" in order to gather waypoint data. Additionally or alternatively, in block 1906, the time availability or accessibility information for waypoints may be obtained from one or more third-party services. For example, a party associated with the waypoint may provide when it is open or accessible (e.g., available time of the day and/or year) and one or more accessible routes to reach its location. In some embodiments, the third-party services may include reservation services. In such embodiments, the navigation system 130 may communicate with the reservation services to obtain time availability or accessibility information for waypoints.

Subsequent to obtaining the time availability or accessibility information for waypoints, the navigation system 130 stores or updates waypoint data accordingly. Such waypoint data may be stored in a database (e.g., 134) of the navigation system and/or in a database of a server (e.g., 150). The waypoint data may be accessible by one or more navigation systems and/or computing devices.

In block 1910, the navigation system 130 presents one or more waypoints to the user. It should be appreciated that the waypoints may be presented to the user on a display screen (e.g., 140) of the vehicle 120 and/or a display screen of the computing device (e.g., 160). To do so, the navigation system 130 may determine which waypoints to present to the user based on the location of the user, as indicated in block 1912. Additionally or alternatively, the waypoints may be determined based on a destination received from the user, as indicated in block 1914. For example, the user may indicate a type of destination and/or waypoint that the user wants to stop on the way to the destination (e.g., a food stop, a restaurant, a maintenance/gear shop, a gas station, an information desk, and/or a scenic vista). In response, the navigation system 130 may present one or more waypoints to the user based on the user's preference.

In block 1916, the navigation system 130 receives a selection of one or more waypoints from the user. If the navigation system 130 determines that a selection was not received in block 1918 shown in FIG. 20, the method 1900 loops back to block 1916 to continue await a selection of one or more waypoints from the user. If, however, the navigation system 130 determines that a selection was received in block 1918, the method 1900 advances to block 1920.

In block 1920, for each selected waypoint, the navigation system 130 determines whether the selected waypoint is available and/or accessible based on the waypoint data. For example, the navigation system 130 may determine whether the waypoint is open or otherwise available based on the estimated time of the arrival (e.g., time, day, month, and/or year) at the selected waypoint. If the navigation system 130 determines that the selected waypoint is open or otherwise available based on the waypoint data, the navigation system 130 may further determine whether it is accessible via a vehicle (e.g., 120) that the user is riding. It should be appreciated that such determination may be based on the time of the year (e.g., season) or the current weather. For example, some scenic vista or a route to such scenic vista may only be available and accessible during a certain time of the year and/or certain weather condition.

If the navigation system 130 determines that the selected waypoint is available and/or accessible in block 1922, the method 1900 advances to block 1924. In block 1924, the navigation system 130 retrieves one or more routes to the selected waypoints. Subsequently, the navigation system 130 displays the one or more routes to the user. It should be appreciated that the one or more routes may be presented to the user on the display screen (e.g., 140) of the vehicle 120 and/or the display screen of the computing device (e.g., 160). In some embodiments, the navigation system 130 may further provide a recommended route (e.g., shortest distance, fastest, and/or safest route based on user preference) to the user.

Referring back to block 1922, if the navigation system 130 determines that the selected waypoint is not available and/or accessible, the method 1900 skips ahead to block 1930. In block 1930, the navigation system 130 notifies the user that the selected waypoint is not available and/or accessible. In some embodiments, the navigation system 130 may provide availability of the selected waypoint so that the user can plan accordingly. In some embodiments, the navigation system 130 may determine one or more recommended waypoints that are available and accessible based on the type of the selected waypoint. In such embodiments, the navigation system 130 may present the recommended waypoints to the user, as indicated in block 1934. Subsequently, the method 1900 loops back to block 1916 to await a selection of waypoint from the user.

It should be understood that although the method 1900 is described as being performed by the navigation system 130, in some examples, such method (i.e., entire or a part of method 1900) may be performed by an application executing on a computing device (e.g., 160). For example, the computing device may be a mobile device of the user.

In some embodiments, a display screen (e.g., 140) of the navigation system (e.g., 130) of a vehicle (e.g., 120) may provide exemplary screenshots of route recommendations to destinations with available or accessible waypoints by season. For example, some routes and destinations may only be available during a particular season. The destination may include a food stop, a restaurant, a maintenance/gear shop, a gas station, an information desk, and/or a scenic vista. To do so, a navigation system (e.g., 130) or a computing device (e.g., 160) may prompt one or more questions to a user to gather seasonal route data. For example, the prompt may include "Were you able to access this in the summer?" or "Was this destination open in the summer?" in order to gather the seasonal route data to generate one or more route recommendations. Such data may be shared with friends and/or the public in order to generate route recommendations to a destination with available or accessible waypoints based on the season.

In some embodiments, if a user of a vehicle selects a destination on a navigation system of a vehicle, the navigation system may determine whether the selected destination is available or accessible based on the current season of the destination. If it is available, the navigation system may retrieve one or more recommended routes to the destination based on the seasonal route data. Such route recommendations may be presented to the user on the display screen of the vehicle.

It should be appreciated that, in some embodiments, the user may select a destination on a computing device (e.g., 160) and the computing device may determine whether the selected destination is available or accessible based on the current season of the destination and generate one or more route recommendations with available or accessible waypoints. Additionally, if the user is planning a trip in the future, the user may select a date or month with the destination, and the computing device may determine whether the destination is available or accessible at the selected time of the year.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A navigation system for dynamically navigating around inclement weather for a recreational vehicle, the navigation system comprising:
   a display screen;
   a processor; and
   memory comprising instructions that when executed by the processor cause the processor to:
      receive a destination from a user;
      determine a travel route to the destination;
      obtain weather data of locations along the travel route;
      determine whether inclement weather is expected along the travel route based on the weather data; and
      determine, in response to the determination that the inclement weather is expected, if an alternative route to the destination is available to avoid the inclement weather; and
      display on the display screen the alternative route including a color coded indication of a probability of inclement weather at a plurality of locations along the alternative route, the probability representing times when the recreational vehicle is expected to be at each of the plurality of locations.

2. The navigation system of claim 1, wherein the memory further comprising instructions that when executed by the processor cause the processor to:
   display, in response to determination that the alternative route is available, the alternative route to the user;
   receive a request to set the alternative route to a new travel route; and navigate to the destination via the new travel route.

3. The navigation system of claim 1, wherein the memory further comprising instructions that when executed by the processor cause the processor to:

notify, in response to determining that the alternative route is unavailable, the user how much time the user has until expecting to experience the inclement weather;
query the user whether to seek lodging before experiencing inclement weather;
determine, in response to a receipt of a response to seek lodging, one or more lodging locations;
display the one or more lodging locations;
receive a response from the user indicating a lodging location selected from the one or more lodging locations; and
determine a new route to the selected lodging location.

4. The navigation system of claim 1, wherein the memory further comprising instructions that when executed by the processor cause the processor to:
query the user whether to notify someone that an expected arrival time has changed; receive a response from the user requesting to notify one or more contacts; and transmit, in response to a receipt of the response, a message to the one or more contacts.

5. A method for dynamically navigating around inclement weather for a recreational vehicle, the method comprising:
   receiving, by a navigation system of the recreational vehicle, a destination from a user;
   determining, by the navigation system, a travel route to the destination;
   obtaining, by the navigation system, weather data of locations along the travel route;
   determining, by the navigation system, whether inclement weather is expected along the travel route based on the weather data; and
   determining, in response to determining that the inclement weather is expected and by the navigation system, if an alternative route to the destination is available to avoid the inclement weather; and
   displaying on a display screen the alternative route including a color coded indication of a probability of inclement weather at a plurality of locations along the alternative route, the probability representing times when the recreational vehicle is expected to be at each of the plurality of locations.

6. The method of claim 5, further comprising:
displaying, in response to determining that the alternative route is available and by the navigation system, the alternative route to the user;
receiving, by the navigation system, a request to set the alternative route to a new travel route; and
navigating, by the navigation system, to the destination via the new travel route.

7. The method of claim 5, further comprising:
notifying, in response to determining that the alternative route is unavailable and by the navigation system, the user how much time the user has until expecting to experience the inclement weather;
querying, by the navigation system, the user whether to seek lodging before experiencing inclement weather;
determining, in response to receiving a response to seek lodging and by the navigation system, one or more lodging locations;
displaying, by the navigation system, the one or more lodging locations;
receiving, by the navigation system, a response from the user indicating a lodging location selected from the one or more lodging locations; and
determining, by the navigation system, a new route to the selected lodging location.

8. The method of claim 5, further comprising:
querying, by the navigation system, the user whether to notify someone that an expected arrival time has changed;
receiving, by the navigation system, a response from the user requesting to notify one or more contacts; and
transmitting, in response to receiving the response and by the navigation system, a message to the one or more contacts.

9. The system of claim 1, wherein the instructions further comprise:
determining one or more vehicle parameters; and
dynamically update a fuel range based on the one or more current vehicle parameters, and
wherein the one or more current vehicle parameters include a fuel level percentage and an average fuel economy.

10. The method of claim 5, further comprising:
determining one or more vehicle parameters; and
dynamically updating a fuel range based on the one or more current vehicle parameters, and
wherein the one or more current vehicle parameters include a fuel level percentage and an average fuel economy.

11. The system of claim 1, wherein the memory further comprising instructions that when executed by the processor cause the processor to:
dynamically update the determined inclement weather based on a current vehicle speed.

12. The method of claim 5, wherein the processor dynamically updates the determined inclement weather based on a current vehicle speed.

13. The system of claim 1, wherein the memory further comprising instructions that when executed by the processor cause the processor to:
determine points of interest that are not expected to encounter inclement weather for a given period of time.

14. The method of claim 5, further comprising:
displaying on the display screen a fuel range indicator indicating a different level of fuel range, the fuel range indicator comprises of a plurality of colors including a first color indicating a first threshold fuel level and a second color indicating a second threshold fuel level.

15. The method of claim 14, wherein the fuel range indicator is a line over the travel route, the line comprising a first section indicating the first threshold fuel level and a second section indicating the second threshold fuel level.

16. The method of claim 14, wherein the plurality of colors includes a third color indicating a third threshold fuel level, and the line comprises a third section indicating the third threshold fuel level.

17. The method of claim 7, further comprising:
navigating, in response to determining that the user does not want to seek lodging, along the travel route; and
notifying the user how much time the user has until expecting to experience the inclement weather.

18. The method of claim 14, further comprising:
determining, based upon a fuel range, a fuel stop is needed;
determining, based upon the need for a fuel stop, one or more gas stations along the travel route.

19. The navigation system of claim 1, wherein the instructions further comprise:
determining, based upon a fuel range, a fuel stop is needed;
determining, based upon the need for a fuel stop, one or more gas stations along the travel route.

20. The navigation system of claim 1, wherein the alternative route indicates a percentage chance of precipitation at each of the plurality of locations along the alternative route when the recreational vehicle is expected to be at each of the plurality of locations.

21. The method of claim 5, wherein the alternative route indicates a percentage chance of precipitation at each of the plurality of locations along the alternative route when the recreational vehicle is expected to be at each of the plurality of locations.

22. The navigation system of claim 1, further comprising determining that the inclement weather has a severity above a predetermined threshold, and wherein the instructions cause the processor to determine if an alternative route to the destination is available only in response to the determination that the inclement weather is expected.

23. The navigation system of claim 1, further comprising displaying on the display screen the travel route including an initial color-coded indication of probability of inclement weather along the travel route.

* * * * *